United States Patent
Grohman et al.

(10) Patent No.: US 8,437,877 B2
(45) Date of Patent: May 7, 2013

(54) SYSTEM RECOVERY IN A HEATING, VENTILATION AND AIR CONDITIONING NETWORK

(75) Inventors: Wojciech Grohman, Little Elm, TX (US); Darko Hadzidedic, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 553 days.

(21) Appl. No.: 12/603,493

(22) Filed: Oct. 21, 2009

(65) Prior Publication Data

US 2010/0107007 A1    Apr. 29, 2010

Related U.S. Application Data

(63) Continuation-in-part of application No. 12/258,659, filed on Oct. 27, 2008.

(60) Provisional application No. 61/167,135, filed on Apr. 6, 2009.

(51) Int. Cl.
*G01M 1/38* (2006.01)

(52) U.S. Cl.
USPC .............................................. 700/276; 700/82

(58) Field of Classification Search .................... 700/82, 700/276
See application file for complete search history.

(56) References Cited

U.S. PATENT DOCUMENTS

| | | |
|---|---|---|
| 4,262,736 A | 4/1981 | Gilkeson et al. |
| 4,296,464 A | 10/1981 | Woods et al. |
| 4,381,549 A | 4/1983 | Stamp et al. |
| 4,464,543 A | 8/1984 | Kline et al. |
| 4,482,785 A | 11/1984 | Finnegan et al. |
| 4,501,125 A | 2/1985 | Han |
| 4,606,042 A | 8/1986 | Kahn et al. |
| 4,616,325 A | 10/1986 | Heckenbach et al. |
| 4,694,394 A | 9/1987 | Costantini |
| 4,698,628 A | 10/1987 | Herkert et al. |
| 4,703,325 A | 10/1987 | Chamberlin et al. |

(Continued)

FOREIGN PATENT DOCUMENTS

| | | |
|---|---|---|
| EP | 0980165 A2 | 2/2000 |
| EP | 1956311 A2 | 8/2008 |

(Continued)

OTHER PUBLICATIONS

Related case U.S. Appl. No. 12/603,534, filed Oct. 21, 2009 to Timothy Wallaert et al., entitled "Flush Wall Mount Thermostat and In-Set Mounting Plate for a Heating, Ventilation and Air Conditioning System".

(Continued)

*Primary Examiner* — Kavita Padmanabhan
*Assistant Examiner* — Chad Rapp

(57) ABSTRACT

The disclosure provides a system and method of retrieving data for an active subnet controller of a subnet in an HVAC network. In an embodiment, a device on said subnet reports a loss of internal memory settings to said active subnet controller. The device is recognized by the active subnet controller. At least one list of parameters is requested from the device by the active subnet controller. An order of said at least one list of parameters is employed to convey corresponding stored values of these parameters from the active subnet controller to the coupled device.

20 Claims, 13 Drawing Sheets

U.S. PATENT DOCUMENTS

| | | |
|---|---|---|
| 4,706,247 A | 11/1987 | Yoshioka |
| 4,723,239 A | 2/1988 | Schwartz |
| 4,829,447 A | 5/1989 | Parker et al. |
| 4,841,450 A | 6/1989 | Fredriksson |
| 4,843,084 A | 6/1989 | Parker et al. |
| 4,873,649 A | 10/1989 | Grald et al. |
| 4,884,214 A | 11/1989 | Parker et al. |
| 4,887,262 A | 12/1989 | van Veldhuizen |
| 4,888,728 A | 12/1989 | Shirakawa et al. |
| 4,889,280 A | 12/1989 | Grald et al. |
| 4,931,948 A | 6/1990 | Parker et al. |
| 4,941,143 A | 7/1990 | Twitty et al. |
| 4,942,613 A | 7/1990 | Lynch |
| 4,947,484 A | 8/1990 | Twitty et al. |
| 4,947,928 A | 8/1990 | Parker et al. |
| 4,953,083 A | 8/1990 | Takata et al. |
| 4,955,018 A | 9/1990 | Twitty et al. |
| 4,967,567 A | 11/1990 | Proctor et al. |
| 4,978,896 A | 12/1990 | Shah |
| 4,991,770 A | 2/1991 | Bird et al. |
| 4,996,513 A | 2/1991 | Mak et al. |
| 5,006,827 A | 4/1991 | Brueton et al. |
| 5,018,138 A | 5/1991 | Twitty et al. |
| 5,039,980 A | 8/1991 | Aggers et al. |
| 5,042,997 A | 8/1991 | Rhodes |
| 5,058,388 A | 10/1991 | Shaw et al. |
| 5,061,916 A | 10/1991 | French et al. |
| 5,065,813 A | 11/1991 | Berkeley et al. |
| 5,086,385 A | 2/1992 | Launey et al. |
| 5,103,896 A | 4/1992 | Saga |
| 5,105,366 A | 4/1992 | Beckey |
| 5,115,967 A | 5/1992 | Wedekind |
| 5,128,855 A | 7/1992 | Hilber et al. |
| 5,165,465 A | 11/1992 | Kenet |
| 5,170,935 A | 12/1992 | Federspiel et al. |
| 5,180,102 A | 1/1993 | Gilbert et al. |
| 5,181,653 A | 1/1993 | Foster et al. |
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,259,553 A | 11/1993 | Shyu |
| 5,274,571 A | 12/1993 | Hesse et al. |
| 5,276,630 A | 1/1994 | Baldwin et al. |
| 5,277,036 A | 1/1994 | Dieckmann et al. |
| 5,278,957 A | 1/1994 | Chan |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,341,988 A | 8/1994 | Rein et al. |
| 5,355,323 A | 10/1994 | Bae |
| 5,361,982 A | 11/1994 | Liebi et al. |
| 5,374,200 A | 12/1994 | Giroux |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,434,965 A | 7/1995 | Matheny et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,450,570 A | 9/1995 | Richek et al. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,475,364 A | 12/1995 | Kenet |
| 5,481,481 A | 1/1996 | Frey et al. |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,511,188 A | 4/1996 | Pascucci et al. |
| 5,513,324 A | 4/1996 | Dolin, Jr. et al. |
| 5,515,267 A | 5/1996 | Alsenz |
| 5,520,328 A | 5/1996 | Bujak, Jr. |
| 5,522,044 A | 5/1996 | Pascucci et al. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A | 8/1996 | Brown et al. |
| 5,544,809 A | 8/1996 | Keating et al. |
| 5,550,980 A | 8/1996 | Pascucci et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,369 A | 3/1997 | Sato et al. |
| 5,617,282 A | 4/1997 | Rall et al. |
| 5,621,662 A | 4/1997 | Humphries et al. |
| 5,628,201 A | 5/1997 | Bahel et al. |
| 5,630,325 A | 5/1997 | Bahel et al. |
| 5,631,825 A | 5/1997 | van Weele et al. |
| 5,634,590 A | 6/1997 | Gorski et al. |
| 5,675,756 A | 10/1997 | Benton et al. |
| 5,675,830 A | 10/1997 | Satula |
| 5,684,463 A | 11/1997 | Diercks et al. |
| 5,684,717 A | 11/1997 | Beilfuss et al. |
| 5,699,243 A | 12/1997 | Eckel et al. |
| 5,706,190 A | 1/1998 | Russ et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,737,529 A | 4/1998 | Dolin, Jr. et al. |
| 5,748,923 A | 5/1998 | Eitrich |
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |
| 5,772,732 A | 6/1998 | James et al. |
| 5,774,322 A | 6/1998 | Walter et al. |
| 5,774,492 A | 6/1998 | Orlowsik, Jr. et al. |
| 5,774,493 A | 6/1998 | Ross |
| 5,777,837 A | 7/1998 | Eckel et al. |
| 5,782,296 A | 7/1998 | Mehta |
| 5,784,647 A | 7/1998 | Sugimoto |
| 5,786,993 A | 7/1998 | Frutiger et al. |
| 5,787,027 A | 7/1998 | Dolan et al. |
| 5,791,332 A | 8/1998 | Thompson et al. |
| 5,793,646 A | 8/1998 | Hibberd et al. |
| 5,801,942 A | 9/1998 | Nixon et al. |
| 5,802,485 A | 9/1998 | Koelle et al. |
| 5,803,357 A | 9/1998 | Lakin |
| 5,809,063 A | 9/1998 | Ashe et al. |
| 5,809,556 A | 9/1998 | Fujisawa et al. |
| 5,816,492 A | 10/1998 | Charles et al. |
| 5,818,347 A | 10/1998 | Dolan et al. |
| 5,819,845 A | 10/1998 | Ryu et al. |
| 5,822,512 A | 10/1998 | Goodrum et al. |

| | | | |
|---|---|---|---|
| 5,826,038 A | 10/1998 | Nakazumi | |
| 5,829,674 A | 11/1998 | Vanostrand et al. | |
| 5,841,654 A | 11/1998 | Verissimo et al. | |
| 5,848,887 A | 12/1998 | Zabielski et al. | |
| 5,854,744 A | 12/1998 | Zeng et al. | |
| 5,856,972 A | 1/1999 | Riley et al. | |
| 5,860,411 A | 1/1999 | Thompson et al. | |
| 5,860,473 A | 1/1999 | Seiden | |
| 5,862,052 A | 1/1999 | Nixon et al. | |
| 5,862,411 A | 1/1999 | Kay et al. | |
| 5,864,581 A | 1/1999 | Alger-Meunier et al. | |
| 5,873,519 A | 2/1999 | Beilfuss | |
| 5,878,236 A | 3/1999 | Kleineberg et al. | |
| 5,883,627 A | 3/1999 | Pleyer | |
| 5,884,072 A | 3/1999 | Rasmussen | |
| 5,892,690 A | 4/1999 | Boatman et al. | |
| 5,896,304 A | 4/1999 | Tiemann et al. | |
| 5,900,674 A | 5/1999 | Wojnarowski et al. | |
| 5,903,454 A | 5/1999 | Hoffberg et al. | |
| 5,912,877 A | 6/1999 | Shirai et al. | |
| 5,914,453 A | 6/1999 | James et al. | |
| 5,915,101 A | 6/1999 | Kleineberg et al. | |
| 5,924,486 A | 7/1999 | Ehlers et al. | |
| 5,927,398 A | 7/1999 | Maciulewicz | |
| 5,930,249 A | 7/1999 | Stademann et al. | |
| 5,933,655 A | 8/1999 | Vrabec et al. | |
| 5,934,554 A | 8/1999 | Charles et al. | |
| 5,937,942 A | 8/1999 | Bias et al. | |
| 5,946,209 A | 8/1999 | Eckel et al. | |
| 5,971,597 A | 10/1999 | Baldwin et al. | |
| 5,973,594 A | 10/1999 | Baldwin et al. | |
| 5,983,353 A | 11/1999 | McHann, Jr. | |
| 5,983,646 A | 11/1999 | Grothe et al. | |
| 5,993,195 A | 11/1999 | Thompson | |
| 6,006,142 A | 12/1999 | Seem et al. | |
| 6,011,821 A | 1/2000 | Sauer et al. | |
| 6,021,252 A | 2/2000 | Faris et al. | |
| 6,028,864 A | 2/2000 | Marttinen et al. | |
| 6,032,178 A | 2/2000 | Bacigalupo et al. | |
| 6,035,024 A | 3/2000 | Stumer | |
| 6,046,410 A | 4/2000 | Wojnarowski et al. | |
| 6,049,817 A | 4/2000 | Schoen et al. | |
| 6,052,525 A | 4/2000 | Carlson et al. | |
| 6,053,416 A | 4/2000 | Specht et al. | |
| 6,061,600 A | 5/2000 | Ying | |
| 6,061,603 A | 5/2000 | Papadopoulos et al. | |
| 6,078,660 A | 6/2000 | Burgess | |
| 6,082,894 A | 7/2000 | Batko et al. | |
| 6,092,280 A | 7/2000 | Wojnarowski | |
| 6,095,674 A | 8/2000 | Verissimo et al. | |
| 6,098,116 A | 8/2000 | Nixon et al. | |
| 6,101,824 A | 8/2000 | Meyer et al. | |
| 6,110,260 A | 8/2000 | Kubokawa | |
| 6,115,713 A | 9/2000 | Pascucci et al. | |
| 6,138,227 A | 10/2000 | Thewes et al. | |
| 6,141,595 A | 10/2000 | Gloudeman et al. | |
| 6,145,501 A | 11/2000 | Manohar et al. | |
| 6,145,751 A | 11/2000 | Ahmed | |
| 6,147,601 A | 11/2000 | Sandelman et al. | |
| 6,151,298 A | 11/2000 | Bernhardsson et al. | |
| 6,151,529 A | 11/2000 | Batko | |
| 6,151,625 A | 11/2000 | Swales et al. | |
| 6,151,650 A | 11/2000 | Birzer | |
| 6,155,341 A | 12/2000 | Thompson et al. | |
| 6,160,477 A | 12/2000 | Sandelman et al. | |
| 6,160,484 A | 12/2000 | Spahl et al. | |
| 6,160,795 A | 12/2000 | Hosemann | |
| 6,167,338 A | 12/2000 | De Wille et al. | |
| 6,169,937 B1 | 1/2001 | Peterson | |
| 6,169,964 B1 | 1/2001 | Alsa et al. | |
| 6,170,044 B1 | 1/2001 | McLaughlin et al. | |
| 6,177,945 B1 | 1/2001 | Pleyer | |
| 6,179,213 B1 | 1/2001 | Gibino et al. | |
| 6,182,130 B1 | 1/2001 | Dolin, Jr. et al. | |
| 6,188,642 B1 | 2/2001 | Schoniger et al. | |
| 6,190,442 B1 | 2/2001 | Redner | |
| 6,208,905 B1 | 3/2001 | Giddings et al. | |
| 6,208,924 B1 | 3/2001 | Bauer | |
| 6,211,782 B1 | 4/2001 | Sandelman et al. | |
| 6,216,066 B1 | 4/2001 | Goebel et al. | |
| 6,227,191 B1 | 5/2001 | Garloch | |
| 6,232,604 B1 | 5/2001 | McDaniel et al. | |
| 6,237,113 B1 | 5/2001 | Daiber | |
| 6,240,326 B1 | 5/2001 | Gloudeman et al. | |
| 6,241,156 B1 | 6/2001 | Kline et al. | |
| 6,252,890 B1 | 6/2001 | Alger-Meunier et al. | |
| 6,254,009 B1 | 7/2001 | Proffitt et al. | |
| 6,266,205 B1 | 7/2001 | Schreck et al. | |
| 6,269,127 B1 | 7/2001 | Richards | |
| 6,271,845 B1 | 8/2001 | Richardson | |
| 6,282,454 B1 | 8/2001 | Papadopoulos et al. | |
| 6,285,912 B1 | 9/2001 | Ellison et al. | |
| 6,292,518 B1 | 9/2001 | Grabb et al. | |
| 6,298,376 B1 | 10/2001 | Rosner et al. | |
| 6,298,454 B1 | 10/2001 | Schleiss et al. | |
| 6,298,551 B1 | 10/2001 | Wojnarowski et al. | |
| 6,304,557 B1 | 10/2001 | Nakazumi | |
| 6,307,331 B1 | 10/2001 | Bonasia et al. | |
| 6,324,008 B1 | 11/2001 | Baldwin et al. | |
| 6,324,854 B1 | 12/2001 | Jayanth | |
| 6,336,065 B1 | 1/2002 | Gibson et al. | |
| 6,343,236 B1 | 1/2002 | Gibson et al. | |
| 6,349,306 B1 | 2/2002 | Malik et al. | |
| 6,349,883 B1 | 2/2002 | Simmons et al. | |
| 6,353,775 B1 | 3/2002 | Nichols | |
| 6,374,373 B1 | 4/2002 | Heim et al. | |
| 6,377,283 B1 | 4/2002 | Thomas | |
| 6,385,510 B1 | 5/2002 | Hoog et al. | |
| 6,390,806 B1 | 5/2002 | Dempsey et al. | |
| 6,393,023 B1 | 5/2002 | Shimizu et al. | |
| 6,400,996 B1 | 6/2002 | Hoffberg et al. | |
| 6,405,104 B1 | 6/2002 | Dougherty | |
| 6,408,228 B1 | 6/2002 | Seem et al. | |
| 6,411,701 B1 | 6/2002 | Stademann | |
| 6,411,857 B1 | 6/2002 | Flood | |
| 6,412,435 B1 | 7/2002 | Timmons, Jr. | |
| 6,415,395 B1 | 7/2002 | Varma et al. | |
| 6,418,507 B1 | 7/2002 | Fackler | |
| 6,423,118 B1 | 7/2002 | Becerra et al. | |
| 6,424,872 B1 | 7/2002 | Glanzer et al. | |
| 6,424,874 B1 | 7/2002 | Cofer | |
| 6,427,454 B1 | 8/2002 | West | |
| 6,429,845 B1 | 8/2002 | Unseld et al. | |
| 6,430,953 B2 | 8/2002 | Roh | |
| 6,434,715 B1 | 8/2002 | Andersen | |
| 6,435,418 B1 | 8/2002 | Toth et al. | |
| 6,437,691 B1 | 8/2002 | Sandelman et al. | |
| 6,437,805 B1 | 8/2002 | Sojoodi et al. | |
| 6,441,723 B1 | 8/2002 | Mansfield et al. | |
| 6,442,952 B2 | 9/2002 | Roh et al. | |
| 6,448,896 B1 | 9/2002 | Bankus et al. | |
| 6,449,315 B2 | 9/2002 | Richards | |
| 6,450,409 B1 | 9/2002 | Rowlette et al. | |
| 6,453,374 B1 | 9/2002 | Kovalan et al. | |
| 6,454,177 B1 | 9/2002 | Sasao et al. | |
| 6,462,654 B1 | 10/2002 | Sandelman et al. | |
| 6,478,084 B1 | 11/2002 | Kumar et al. | |
| 6,493,661 B1 | 12/2002 | White et al. | |
| 6,497,570 B1 | 12/2002 | Sears et al. | |
| 6,498,844 B1 | 12/2002 | Stademann | |
| 6,501,995 B1 | 12/2002 | Kinney et al. | |
| 6,504,338 B1 | 1/2003 | Eichorn | |
| 6,505,087 B1 | 1/2003 | Lucas et al. | |
| 6,508,407 B1 | 1/2003 | Lefkowitz et al. | |
| 6,526,122 B2 | 2/2003 | Matsushita et al. | |
| 6,535,123 B2 | 3/2003 | Sandelman et al. | |
| 6,535,138 B1 | 3/2003 | Dolan et al. | |
| 6,539,489 B1 | 3/2003 | Reinert | |
| 6,540,148 B1 | 4/2003 | Salsbury et al. | |
| 6,542,462 B1 | 4/2003 | Sohraby et al. | |
| 6,543,007 B1 | 4/2003 | Bliley et al. | |
| 6,545,660 B1 | 4/2003 | Shen et al. | |
| 6,546,008 B1 | 4/2003 | Wehrend | |
| 6,552,647 B1 | 4/2003 | Thiessen et al. | |
| 6,554,198 B1 | 4/2003 | Hull et al. | |
| 6,560,976 B2 | 5/2003 | Jayanth | |
| 6,564,348 B1 | 5/2003 | Barenys et al. | |
| 6,567,476 B2 | 5/2003 | Kohl et al. | |

| | | |
|---|---|---|
| 6,572,363 B1 | 6/2003 | Virgil, Jr. et al. |
| 6,574,215 B1 | 6/2003 | Hummel |
| 6,574,234 B1 | 6/2003 | Myer et al. |
| 6,574,581 B1 | 6/2003 | Bohrer et al. |
| 6,575,233 B1 | 6/2003 | Krumnow |
| 6,580,950 B1 | 6/2003 | Johnson et al. |
| 6,587,039 B1 | 7/2003 | Woestemeyer et al. |
| 6,587,739 B1 | 7/2003 | Abrams et al. |
| 6,587,884 B1 | 7/2003 | Papadopoulos et al. |
| 6,594,272 B1 | 7/2003 | Ketcham et al. |
| 6,595,430 B1 | 7/2003 | Shah |
| 6,600,923 B1 | 7/2003 | Dzuban |
| 6,608,560 B2 | 8/2003 | Abrams |
| 6,609,127 B1 | 8/2003 | Lee et al. |
| 6,615,088 B1 | 9/2003 | Myer et al. |
| 6,615,594 B2 | 9/2003 | Jayanth et al. |
| 6,618,394 B1 | 9/2003 | Hilleary |
| 6,619,555 B2 | 9/2003 | Rosen |
| 6,621,507 B1 | 9/2003 | Shah |
| 6,622,926 B1 | 9/2003 | Sartain et al. |
| 6,628,993 B1 | 9/2003 | Bauer |
| 6,633,781 B1 | 10/2003 | Lee et al. |
| 6,636,771 B1 | 10/2003 | Varma et al. |
| 6,640,145 B2 | 10/2003 | Hoffberg et al. |
| 6,640,890 B1 | 11/2003 | Dage et al. |
| 6,643,689 B2 | 11/2003 | Rode et al. |
| 6,644,557 B1 | 11/2003 | Jacobs |
| 6,647,317 B2 | 11/2003 | Takai et al. |
| 6,650,949 B1 | 11/2003 | Fera et al. |
| 6,651,034 B1 | 11/2003 | Hedlund et al. |
| 6,658,373 B2 | 12/2003 | Rossi et al. |
| RE38,406 E | 1/2004 | Faris et al. |
| 6,681,215 B2 | 1/2004 | Jammu |
| 6,688,387 B1 | 2/2004 | Wellington et al. |
| 6,704,688 B2 | 3/2004 | Aslam et al. |
| 6,708,239 B1 | 3/2004 | Ellerbrock et al. |
| 6,715,120 B1 | 3/2004 | Hladik et al. |
| 6,715,302 B2 | 4/2004 | Ferragut, II |
| 6,715,690 B2 | 4/2004 | Hull et al. |
| 6,717,513 B1 | 4/2004 | Sandelman et al. |
| 6,717,919 B1 | 4/2004 | Ketcham et al. |
| 6,718,384 B2 | 4/2004 | Linzy |
| 6,722,143 B2 | 4/2004 | Moon et al. |
| 6,725,180 B2 | 4/2004 | Mayer et al. |
| 6,725,398 B1 | 4/2004 | Varma et al. |
| 6,728,369 B2 | 4/2004 | Burgess |
| 6,732,191 B1 | 5/2004 | Baker et al. |
| 6,735,196 B1 | 5/2004 | Manzardo |
| 6,735,282 B2 | 5/2004 | Matsushita et al. |
| 6,735,965 B2 | 5/2004 | Moon et al. |
| 6,738,676 B2 | 5/2004 | Hirayama |
| 6,741,915 B2 | 5/2004 | Poth |
| 6,744,771 B1 | 6/2004 | Barber et al. |
| 6,745,106 B2 | 6/2004 | Howard et al. |
| 6,747,888 B2 | 6/2004 | Klein |
| 6,758,050 B2 | 7/2004 | Jayanth et al. |
| 6,758,051 B2 | 7/2004 | Jayanth et al. |
| 6,763,040 B1 | 7/2004 | Hite et al. |
| 6,763,272 B2 | 7/2004 | Knepper |
| 6,765,993 B2 | 7/2004 | Cueman |
| 6,768,732 B1 | 7/2004 | Neuhaus |
| 6,774,786 B1 | 8/2004 | Havekost et al. |
| 6,779,176 B1 | 8/2004 | Chambers, II et al. |
| 6,783,079 B2 | 8/2004 | Carey et al. |
| 6,789,739 B2 | 9/2004 | Rosen |
| 6,791,530 B2 | 9/2004 | Vernier et al. |
| 6,795,935 B2 | 9/2004 | Unkle et al. |
| 6,798,341 B1 | 9/2004 | Eckel et al. |
| 6,801,524 B2 | 10/2004 | Eteminan |
| 6,804,564 B2 | 10/2004 | Crispin et al. |
| 6,810,333 B2 | 10/2004 | Adedeji et al. |
| 6,814,299 B1 | 11/2004 | Carey |
| 6,814,660 B1 | 11/2004 | Cavett |
| 6,816,071 B2 | 11/2004 | Conti |
| 6,817,757 B1 | 11/2004 | Wallace |
| 6,819,802 B2 | 11/2004 | Higgs et al. |
| 6,822,202 B2 | 11/2004 | Atlas |
| 6,823,680 B2 | 11/2004 | Jayanth |
| 6,824,069 B2 | 11/2004 | Rosen |
| 6,826,454 B2 | 11/2004 | Sulfstede |
| 6,826,590 B1 | 11/2004 | Glanzer et al. |
| 6,832,118 B1 | 12/2004 | Heberlein et al. |
| 6,833,787 B1 | 12/2004 | Levi |
| 6,833,844 B1 | 12/2004 | Shiota et al. |
| 6,840,052 B2 | 1/2005 | Smith et al. |
| 6,842,117 B2 | 1/2005 | Keown |
| 6,842,808 B2 | 1/2005 | Weigl et al. |
| 6,845,918 B2 | 1/2005 | Rotondo |
| 6,850,992 B2 | 2/2005 | Heinrich et al. |
| 6,851,948 B2 | 2/2005 | Dempsey et al. |
| 6,853,291 B1 | 2/2005 | Aisa |
| 6,854,444 B2 | 2/2005 | Plagge et al. |
| 6,865,449 B2 | 3/2005 | Dudley |
| 6,865,596 B1 | 3/2005 | Barber et al. |
| 6,865,898 B2 | 3/2005 | Yamanashi et al. |
| 6,866,375 B2 | 3/2005 | Leighton et al. |
| 6,868,292 B2 | 3/2005 | Ficco et al. |
| 6,868,900 B2 | 3/2005 | Dage et al. |
| 6,874,693 B2 | 4/2005 | Readio et al. |
| 6,876,891 B1 | 4/2005 | Schuler et al. |
| 6,879,881 B1 | 4/2005 | Attridge, Jr. |
| 6,888,441 B2 | 5/2005 | Carey |
| 6,892,121 B2 | 5/2005 | Schmidt |
| 6,894,703 B2 | 5/2005 | Vernier et al. |
| 6,900,808 B2 | 5/2005 | Lassiter et al. |
| 6,901,316 B1 | 5/2005 | Jensen et al. |
| 6,901,439 B1 | 5/2005 | Bonasia et al. |
| 6,907,329 B2 | 6/2005 | Junger et al. |
| 6,909,948 B2 | 6/2005 | Mollmann et al. |
| 6,914,893 B2 | 7/2005 | Petite |
| 6,918,064 B2 | 7/2005 | Mueller et al. |
| 6,920,318 B2 | 7/2005 | Brooking et al. |
| 6,925,360 B2 | 8/2005 | Yoon et al. |
| 6,931,645 B2 | 8/2005 | Murching et al. |
| 6,938,106 B2 | 8/2005 | Ellerbrock et al. |
| 6,941,193 B2 | 9/2005 | Frecska et al. |
| 6,944,785 B2 | 9/2005 | Gadir et al. |
| 6,954,680 B2 | 10/2005 | Kreidler et al. |
| 6,955,060 B2 | 10/2005 | Homan et al. |
| 6,955,302 B2 | 10/2005 | Erdman, Jr. |
| 6,956,424 B2 | 10/2005 | Hohnel |
| 6,957,696 B1 | 10/2005 | Krumnow |
| 6,963,288 B1 | 11/2005 | Sokol et al. |
| 6,963,922 B2 | 11/2005 | Papadopoulos et al. |
| 6,965,802 B2 | 11/2005 | Sexton |
| 6,967,565 B2 | 11/2005 | Lingemann |
| 6,968,295 B1 | 11/2005 | Carr |
| 6,973,366 B2 | 12/2005 | Komai |
| 6,975,219 B2 | 12/2005 | Eryurek et al. |
| 6,975,913 B2 | 12/2005 | Kreidler et al. |
| 6,975,958 B2 | 12/2005 | Bohrer et al. |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,002,462 B2 | 2/2006 | Welch |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |
| 7,020,798 B2 | 3/2006 | Meng et al. |
| 7,022,008 B2 | 4/2006 | Crocker |
| 7,024,282 B2 | 4/2006 | Coogan et al. |
| 7,024,283 B2 | 4/2006 | Bicknell |
| 7,025,281 B2 | 4/2006 | DeLuca |
| 7,027,808 B2 | 4/2006 | Wesby |
| 7,029,391 B2 | 4/2006 | Nagaya et al. |

| | | |
|---|---|---|
| 7,031,880 B1 | 4/2006 | Seem et al. |
| 7,032,018 B1 | 4/2006 | Lee et al. |
| 7,035,719 B2 | 4/2006 | Howard et al. |
| 7,035,898 B1 | 4/2006 | Baker |
| 7,036,743 B2 | 5/2006 | Shah |
| 7,043,339 B2 | 5/2006 | Maeda et al. |
| 7,044,397 B2 | 5/2006 | Bartlett et al. |
| 7,047,092 B2 | 5/2006 | Wimsatt |
| 7,051,282 B2 | 5/2006 | Marcjan |
| 7,055,759 B2 | 6/2006 | Wacker et al. |
| 7,058,459 B2 | 6/2006 | Weiberle et al. |
| 7,058,477 B1 | 6/2006 | Rosen |
| 7,058,693 B1 | 6/2006 | Baker, Jr. |
| 7,058,737 B2 | 6/2006 | Ellerbrock et al. |
| 7,062,927 B2 | 6/2006 | Kwon et al. |
| 7,068,612 B2 | 6/2006 | Berkcan et al. |
| 7,076,962 B2 | 7/2006 | He et al. |
| 7,082,339 B2 | 7/2006 | Murray et al. |
| 7,082,352 B2 | 7/2006 | Lim |
| 7,083,109 B2 | 8/2006 | Pouchak |
| 7,085,626 B2 | 8/2006 | Harrod et al. |
| 7,085,814 B1 | 8/2006 | Gandhi et al. |
| 7,089,087 B2 | 8/2006 | Dudley |
| 7,089,088 B2 | 8/2006 | Terry et al. |
| 7,089,530 B1 | 8/2006 | Dardinski et al. |
| 7,092,768 B1 | 8/2006 | Labuda |
| 7,092,772 B2 | 8/2006 | Murray et al. |
| 7,092,794 B1 | 8/2006 | Hill et al. |
| 7,096,078 B2 | 8/2006 | Burr et al. |
| 7,096,285 B2 | 8/2006 | Ellerbrock et al. |
| 7,096,465 B1 | 8/2006 | Dardinski et al. |
| 7,099,965 B2 | 8/2006 | Ellerbrock et al. |
| 7,100,382 B2 | 9/2006 | Butler et al. |
| 7,103,000 B1 | 9/2006 | Rode et al. |
| 7,103,016 B1 | 9/2006 | Duffy et al. |
| 7,103,420 B2 | 9/2006 | Brown et al. |
| 7,110,835 B2 | 9/2006 | Blevins et al. |
| 7,114,088 B2 | 9/2006 | Horbelt |
| 7,114,554 B2 | 10/2006 | Bergman et al. |
| 7,117,050 B2 | 10/2006 | Sasaki et al. |
| 7,117,051 B2 | 10/2006 | Landry et al. |
| 7,117,395 B2 | 10/2006 | Opaterny |
| 7,120,036 B2 | 10/2006 | Kyono |
| 7,123,428 B2 | 10/2006 | Yeo et al. |
| 7,123,774 B2 | 10/2006 | Dhavala et al. |
| 7,127,305 B1 | 10/2006 | Palmon |
| 7,127,327 B1 | 10/2006 | O'Donnell |
| 7,130,409 B2 | 10/2006 | Beyda |
| 7,130,719 B2 | 10/2006 | Ehlers et al. |
| 7,133,407 B2 | 11/2006 | Jinzaki et al. |
| 7,133,748 B2 | 11/2006 | Robinson |
| 7,133,749 B2 | 11/2006 | Goldberg et al. |
| 7,135,982 B2 | 11/2006 | Lee |
| 7,139,550 B2 | 11/2006 | Cuellar et al. |
| 7,142,948 B2 | 11/2006 | Metz |
| 7,146,230 B2 | 12/2006 | Glanzer et al. |
| 7,146,231 B2 | 12/2006 | Schleiss et al. |
| 7,146,253 B2 | 12/2006 | Hoog et al. |
| 7,150,408 B2 | 12/2006 | DeLuca |
| 7,155,318 B2 | 12/2006 | Sharma et al. |
| 7,155,499 B2 | 12/2006 | Soemo et al. |
| 7,156,316 B2 | 1/2007 | Kates |
| 7,162,512 B1 | 1/2007 | Amit et al. |
| 7,162,883 B2 | 1/2007 | Jayanth et al. |
| 7,163,156 B2 | 1/2007 | Kates |
| 7,163,158 B2 | 1/2007 | Rossi et al. |
| 7,167,762 B2 | 1/2007 | Glanzer et al. |
| 7,168,627 B2 | 1/2007 | Kates |
| 7,171,579 B2 | 1/2007 | Weigl et al. |
| 7,172,132 B2 | 2/2007 | Proffitt et al. |
| 7,174,239 B2 | 2/2007 | Butler et al. |
| 7,174,728 B2 | 2/2007 | Jayanth |
| 7,175,086 B2 | 2/2007 | Gascoyne et al. |
| 7,175,098 B2 | 2/2007 | DeLuca |
| 7,177,926 B2 | 2/2007 | Kramer |
| 7,181,317 B2 | 2/2007 | Amundson et al. |
| 7,185,262 B2 | 2/2007 | Barthel et al. |
| 7,186,290 B2 | 3/2007 | Sheehan et al. |
| 7,187,354 B2 | 3/2007 | Min et al. |
| 7,187,986 B2 | 3/2007 | Johnson et al. |
| 7,188,002 B2 | 3/2007 | Chapman, Jr. et al. |
| 7,188,207 B2 | 3/2007 | Mitter |
| 7,188,482 B2 | 3/2007 | Sadegh et al. |
| 7,188,779 B2 | 3/2007 | Alles |
| 7,191,028 B2 | 3/2007 | Nomura et al. |
| 7,194,663 B2 | 3/2007 | Fletcher et al. |
| 7,195,211 B2 | 3/2007 | Kande et al. |
| 7,197,717 B2 | 3/2007 | Anderson et al. |
| 7,200,450 B2 | 4/2007 | Boyer et al. |
| 7,203,165 B1 | 4/2007 | Kowalewski |
| 7,203,575 B2 | 4/2007 | Maturana et al. |
| 7,203,776 B2 | 4/2007 | Junger et al. |
| 7,206,646 B2 | 4/2007 | Nixon et al. |
| 7,206,647 B2 | 4/2007 | Kumar |
| 7,209,485 B2 | 4/2007 | Guse |
| 7,209,748 B2 | 4/2007 | Wong et al. |
| 7,212,825 B2 | 5/2007 | Wong et al |
| 7,213,044 B2 | 5/2007 | Tjong et al. |
| 7,216,016 B2 | 5/2007 | Van Ostrand et al. |
| 7,216,017 B2 | 5/2007 | Kwon et al. |
| 7,216,497 B2 | 5/2007 | Hull et al. |
| 7,218,589 B2 | 5/2007 | Wisnudel et al. |
| 7,218,996 B1 | 5/2007 | Beitelmal et al. |
| 7,219,141 B2 | 5/2007 | Bonasia et al. |
| 7,222,111 B1 | 5/2007 | Budke, Jr. |
| 7,222,152 B1 | 5/2007 | Thompson et al. |
| 7,222,493 B2 | 5/2007 | Jayanth et al. |
| 7,222,494 B2 | 5/2007 | Peterson et al. |
| 7,224,366 B2 | 5/2007 | Kessler et al. |
| 7,225,054 B2 | 5/2007 | Amundson et al. |
| 7,225,356 B2 | 5/2007 | Monitzer |
| 7,228,187 B2 | 6/2007 | Ticky et al. |
| 7,232,058 B2 | 6/2007 | Lee |
| 7,233,229 B2 | 6/2007 | Stroupe et al. |
| 7,239,623 B2 | 7/2007 | Burghardt et al. |
| 7,242,988 B1 | 7/2007 | Hoffberg et al. |
| 7,243,004 B2 | 7/2007 | Shah et al. |
| 7,244,294 B2 | 7/2007 | Kates |
| 7,246,753 B2 | 7/2007 | Hull et al. |
| 7,248,576 B2 | 7/2007 | Hoffmann |
| 7,251,534 B2 | 7/2007 | Walls et al. |
| 7,257,813 B1 | 8/2007 | Mayer et al. |
| 7,259,666 B1 | 8/2007 | Hermsmeyer et al. |
| 7,260,084 B2 | 8/2007 | Saller |
| 7,260,451 B2 | 8/2007 | Takai et al. |
| 7,260,609 B2 | 8/2007 | Fuehrer et al. |
| 7,260,948 B2 | 8/2007 | Jayanth et al. |
| 7,261,241 B2 | 8/2007 | Eoga |
| 7,261,243 B2 | 8/2007 | Butler et al. |
| 7,261,762 B2 | 8/2007 | Kang et al. |
| 7,266,775 B2 | 9/2007 | Patitucci |
| 7,266,960 B2 | 9/2007 | Shah |
| 7,269,962 B2 | 9/2007 | Bachmann |
| 7,272,154 B2 | 9/2007 | Loebig |
| 7,272,452 B2 | 9/2007 | Coogan et al. |
| 7,272,457 B2 | 9/2007 | Glanzer et al. |
| 7,274,972 B2 | 9/2007 | Amundson et al. |
| 7,274,973 B2 | 9/2007 | Nichols et al. |
| 7,277,280 B2 | 10/2007 | Peng |
| 7,277,970 B2 | 10/2007 | Ellerbrock et al. |
| 7,278,103 B1 | 10/2007 | Clark et al. |
| 7,287,062 B2 | 10/2007 | Im et al. |
| 7,287,708 B2 | 10/2007 | Lucas et al. |
| 7,287,709 B2 | 10/2007 | Proffitt et al. |
| 7,289,458 B2 | 10/2007 | Gila et al. |
| 7,292,900 B2 | 11/2007 | Kreidler et al. |
| 7,293,422 B2 | 11/2007 | Parachini et al. |
| 7,295,099 B2 | 11/2007 | Lee et al. |
| 7,296,426 B2 | 11/2007 | Butler et al. |
| 7,299,279 B2 | 11/2007 | Sadaghiany |
| 7,299,996 B2 | 11/2007 | Garrett et al. |
| 7,301,699 B2 | 11/2007 | Kanamori et al. |
| 7,302,642 B2 | 11/2007 | Smith et al. |
| 7,305,495 B2 | 12/2007 | Carter |
| 7,306,165 B2 | 12/2007 | Shah |
| 7,310,559 B2 | 12/2007 | Walko, Jr. |
| 7,313,465 B1 | 12/2007 | O'Donnell |
| 7,313,716 B2 | 12/2007 | Weigl et al. |

| Patent | Type | Date | Inventor |
|---|---|---|---|
| 7,313,923 | B2 | 1/2008 | Jayanth et al. |
| 7,315,768 | B2 | 1/2008 | Dang et al. |
| 7,317,970 | B2 | 1/2008 | Pienta et al. |
| 7,318,089 | B1 | 1/2008 | Stachura et al. |
| 7,320,110 | B2 | 1/2008 | Shah |
| 7,324,874 | B2 | 1/2008 | Jung |
| 7,327,376 | B2 | 2/2008 | Shen et al. |
| 7,327,815 | B1 | 2/2008 | Jurisch |
| 7,330,512 | B2 | 2/2008 | Frank et al. |
| 7,331,191 | B2 | 2/2008 | He et al. |
| 7,334,161 | B2 | 2/2008 | Williams et al. |
| 7,336,650 | B2 | 2/2008 | Franz et al. |
| 7,337,369 | B2 | 2/2008 | Barthel et al. |
| 7,337,619 | B2 | 3/2008 | Hsieh et al. |
| 7,343,226 | B2 | 3/2008 | Ehlers et al. |
| 7,346,404 | B2 | 3/2008 | Eryurek et al. |
| 7,346,433 | B2 | 3/2008 | Budike, Jr. |
| 7,346,835 | B1 | 3/2008 | Lobinger et al. |
| 7,349,761 | B1 | 3/2008 | Cruse |
| 7,354,005 | B2 | 4/2008 | Carey et al. |
| 7,356,050 | B2 | 4/2008 | Reindl et al. |
| 7,359,335 | B2 | 4/2008 | Knop et al. |
| 7,359,345 | B2 | 4/2008 | Chang et al. |
| 7,360,002 | B2 | 4/2008 | Brueckner et al. |
| 7,360,370 | B2 | 4/2008 | Shah et al. |
| 7,360,717 | B2 | 4/2008 | Shah |
| 7,364,093 | B2 | 4/2008 | Garozzo |
| 7,365,812 | B2 | 4/2008 | Lee |
| 7,366,498 | B2 | 4/2008 | Ko et al. |
| 7,366,944 | B2 | 4/2008 | Oshins et al. |
| 7,370,074 | B2 | 5/2008 | Alexander et al. |
| 7,377,450 | B2 | 5/2008 | Van Ostrand et al. |
| 7,379,791 | B2 | 5/2008 | Tamarkin et al. |
| 7,379,997 | B2 | 5/2008 | Ehlers et al. |
| 7,383,158 | B2 | 6/2008 | Krocker et al. |
| 7,389,150 | B2 | 6/2008 | Inoue et al. |
| 7,389,204 | B2 | 6/2008 | Eryurek et al. |
| RE40,437 | E | 7/2008 | Rosen et al. |
| 7,392,661 | B2 | 7/2008 | Alles |
| 7,395,122 | B2 | 7/2008 | Kreidler et al. |
| 7,395,137 | B2 | 7/2008 | Robinson |
| 7,403,128 | B2 | 7/2008 | Scuka et al. |
| 7,412,839 | B2 | 8/2008 | Jayanth |
| 7,412,842 | B2 | 8/2008 | Pham |
| 7,418,428 | B2 | 8/2008 | Ehlers et al. |
| 7,424,345 | B2 | 9/2008 | Norbeck |
| D578,026 | S | 10/2008 | Roher et al. |
| 7,433,740 | B2 | 10/2008 | Hesse et al. |
| 7,434,744 | B2 | 10/2008 | Garozzo et al. |
| 7,436,292 | B2 | 10/2008 | Rourke et al. |
| 7,436,293 | B2 | 10/2008 | Rourke et al. |
| 7,436,296 | B2 | 10/2008 | Rourke et al. |
| 7,436,400 | B2 | 10/2008 | Cheng |
| 7,437,198 | B2 | 10/2008 | Iwaki |
| 7,439,862 | B2 | 10/2008 | Quan |
| 7,441,094 | B2 | 10/2008 | Stephens |
| 7,446,660 | B2 | 11/2008 | Posamentier |
| 7,448,435 | B2 | 11/2008 | Garozzo |
| 7,451,937 | B2 | 11/2008 | Flood et al. |
| 7,454,269 | B1 | 11/2008 | Dushane et al. |
| 7,455,240 | B2 | 11/2008 | Chapman, Jr. et al. |
| 7,457,853 | B1 | 11/2008 | Chari et al. |
| 7,460,933 | B2 | 12/2008 | Chapman, Jr. et al. |
| 7,476,988 | B2 | 1/2009 | Mulhouse et al. |
| 7,516,106 | B2 | 4/2009 | Ehlers et al. |
| 7,526,364 | B2 | 4/2009 | Rule et al. |
| 7,567,844 | B2 | 7/2009 | Thomas et al. |
| 7,571,195 | B2 | 8/2009 | Billingsley et al. |
| 7,571,355 | B2 | 8/2009 | Shabalin |
| 7,574,871 | B2 | 8/2009 | Bloemer et al. |
| 7,584,897 | B2 | 9/2009 | Schultz et al. |
| 7,587,459 | B2 | 9/2009 | Wewalaarachchi |
| 7,593,124 | B1 | 9/2009 | Sheng et al. |
| 7,593,787 | B2 | 9/2009 | Feingold et al. |
| 7,604,046 | B2 | 10/2009 | Bergman et al. |
| 7,624,931 | B2 | 12/2009 | Chapman et al. |
| 7,641,126 | B2 | 1/2010 | Schultz et al. |
| 7,650,323 | B2 | 1/2010 | Hesse et al. |
| D610,475 | S | 2/2010 | Beers et al. |
| 7,693,583 | B2 | 4/2010 | Wolff et al. |
| 7,693,591 | B2 | 4/2010 | Hoglund et al. |
| 7,706,923 | B2 | 4/2010 | Amundson et al. |
| 7,730,223 | B1 | 6/2010 | Bavor et al. |
| 7,734,572 | B2 | 6/2010 | Wiemeyer et al. |
| 7,743,124 | B2 | 6/2010 | Holdaway et al. |
| 7,747,757 | B2 | 6/2010 | Garglulo et al. |
| 7,752,289 | B2 | 7/2010 | Kikkawa et al. |
| 7,761,563 | B2 | 7/2010 | Shike et al. |
| 7,774,102 | B2 | 8/2010 | Butler et al. |
| 7,797,349 | B2 | 9/2010 | Kosaka |
| 7,809,472 | B1 | 10/2010 | Silva et al. |
| 7,827,963 | B2 | 11/2010 | Li et al. |
| 7,847,790 | B2 | 12/2010 | Bewley et al. |
| 7,861,941 | B2 | 1/2011 | Schultz et al. |
| 7,870,080 | B2 | 1/2011 | Budike, Jr. |
| 7,886,166 | B2 | 2/2011 | Shnekendorf et al. |
| 7,904,209 | B2 | 3/2011 | Podgorny et al. |
| 7,934,504 | B2 | 5/2011 | Lowe et al. |
| 7,949,615 | B2 | 5/2011 | Ehlers et al. |
| 7,963,454 | B2 | 6/2011 | Sullivan et al. |
| D642,081 | S | 7/2011 | Kashimoto |
| 7,979,164 | B2 | 7/2011 | Garozzo et al. |
| 8,005,576 | B2 | 8/2011 | Rodgers |
| 8,024,054 | B2 | 9/2011 | Mairs et al. |
| 8,032,254 | B2 | 10/2011 | Amundson et al. |
| 8,042,049 | B2 | 10/2011 | Killian et al. |
| D648,641 | S | 11/2011 | Wallaert |
| D648,642 | S | 11/2011 | Wallaert |
| 8,050,801 | B2 | 11/2011 | Richards et al. |
| 8,082,068 | B2 | 12/2011 | Rodgers |
| 8,083,154 | B2 | 12/2011 | Schultz et al. |
| 8,087,593 | B2 | 1/2012 | Leen |
| 8,091,796 | B2 | 1/2012 | Amundson et al. |
| 8,099,178 | B2 | 1/2012 | Mairs et al. |
| 8,103,390 | B2 | 1/2012 | Rodgers |
| 8,112,181 | B2 | 2/2012 | Remsburg |
| 8,116,917 | B2 | 2/2012 | Rodgers |
| 8,122,110 | B1 | 2/2012 | Wilbur et al. |
| 8,127,060 | B2 | 2/2012 | Doll et al. |
| 8,167,216 | B2 | 5/2012 | Schultz et al. |
| 8,183,995 | B2 | 5/2012 | Wang et al. |
| 8,219,249 | B2 | 7/2012 | Harrod et al. |
| 8,224,491 | B2 | 7/2012 | Koster et al. |
| 8,239,066 | B2 | 8/2012 | Jennings et al. |
| 8,239,073 | B2 | 8/2012 | Fausak et al. |
| 8,244,383 | B2 | 8/2012 | Bergman et al. |
| 8,255,090 | B2 | 8/2012 | Frader-Thompson |
| 2001/0025349 | A1 | 9/2001 | Sharood et al. |
| 2001/0034586 | A1 | 10/2001 | Ewert et al. |
| 2001/0048376 | A1 | 12/2001 | Maeda et al. |
| 2001/0055311 | A1 | 12/2001 | Trachewsky et al. |
| 2002/0002425 | A1 | 1/2002 | Dossey et al. |
| 2002/0013897 | A1 | 1/2002 | McTernan et al. |
| 2002/0016639 | A1 | 2/2002 | Smith et al. |
| 2002/0022894 | A1 | 2/2002 | Eryurek et al. |
| 2002/0026476 | A1 | 2/2002 | Miyazaki et al. |
| 2002/0033252 | A1 | 3/2002 | Sasao et al. |
| 2002/0048194 | A1 | 4/2002 | Klein |
| 2002/0072814 | A1 | 6/2002 | Schuler et al. |
| 2002/0091784 | A1 | 7/2002 | Baker et al. |
| 2002/0104323 | A1 | 8/2002 | Rash et al. |
| 2002/0116550 | A1 | 8/2002 | Hansen |
| 2002/0123896 | A1 | 9/2002 | Diez et al. |
| 2002/0124211 | A1 | 9/2002 | Gray et al. |
| 2002/0143523 | A1 | 10/2002 | Balaji et al. |
| 2002/0152298 | A1 | 10/2002 | Kikta et al. |
| 2002/0157054 | A1 | 10/2002 | Shin et al. |
| 2002/0163427 | A1 | 11/2002 | Eryurek et al. |
| 2002/0178288 | A1 | 11/2002 | McLeod |
| 2002/0190242 | A1 | 12/2002 | Iillie et al. |
| 2002/0191026 | A1 | 12/2002 | Rodden et al. |
| 2002/0191603 | A1 | 12/2002 | Shin et al. |
| 2003/0058863 | A1 | 3/2003 | Oost |
| 2003/0061340 | A1 | 3/2003 | Sun et al. |
| 2003/0078677 | A1 | 4/2003 | Hull et al. |
| 2003/0088338 | A1 | 5/2003 | Phillips et al. |
| 2003/0097482 | A1 | 5/2003 | DeHart et al. |
| 2003/0108064 | A1 | 6/2003 | Bilke et al. |

| | | |
|---|---|---|
| 2003/0115177 A1 | 6/2003 | Takanabe et al. |
| 2003/0116637 A1 | 6/2003 | Ellingham |
| 2003/0154355 A1 | 8/2003 | Fernandez |
| 2003/0206100 A1 | 11/2003 | Richman et al. |
| 2003/0229784 A1 | 12/2003 | Cuellar et al. |
| 2004/0001478 A1 | 1/2004 | Wong |
| 2004/0003051 A1 | 1/2004 | Kryzanowski et al. |
| 2004/0003415 A1 | 1/2004 | Ng |
| 2004/0025089 A1 | 2/2004 | Haswarey et al. |
| 2004/0039478 A1 | 2/2004 | Kiesel et al. |
| 2004/0059815 A1 | 3/2004 | Buckingham et al. |
| 2004/0066788 A1 | 4/2004 | Lin et al. |
| 2004/0088069 A1 | 5/2004 | Singh |
| 2004/0095237 A1 | 5/2004 | Chen et al. |
| 2004/0104942 A1 | 6/2004 | Weigel |
| 2004/0107717 A1 | 6/2004 | Yoon et al. |
| 2004/0111186 A1 | 6/2004 | Rossi et al. |
| 2004/0111254 A1 | 6/2004 | Gogel et al. |
| 2004/0117330 A1 | 6/2004 | Ehlers et al. |
| 2004/0133314 A1 | 7/2004 | Ehlers et al. |
| 2004/0133704 A1 | 7/2004 | Kryzyanowski et al. |
| 2004/0138981 A1 | 7/2004 | Ehlers et al. |
| 2004/0139038 A1 | 7/2004 | Ehlers et al. |
| 2004/0143360 A1 | 7/2004 | Kiesel et al. |
| 2004/0146008 A1 | 7/2004 | Conradt et al. |
| 2004/0148482 A1 | 7/2004 | Grundy et al. |
| 2004/0156360 A1 | 8/2004 | Sexton et al. |
| 2004/0159112 A1 | 8/2004 | Jayanth et al. |
| 2004/0189590 A1 | 9/2004 | Mehaffey et al. |
| 2004/0204775 A1 | 10/2004 | Keyes et al. |
| 2004/0205781 A1 | 10/2004 | Hill et al. |
| 2004/0206096 A1 | 10/2004 | Jayanth |
| 2004/0210348 A1 | 10/2004 | Imhof et al. |
| 2004/0218591 A1 | 11/2004 | Ogawa et al. |
| 2004/0222307 A1 | 11/2004 | DeLuca |
| 2004/0236471 A1 | 11/2004 | Poth |
| 2004/0245352 A1 | 12/2004 | Smith et al. |
| 2004/0260427 A1 | 12/2004 | Wimsatt |
| 2004/0266491 A1 | 12/2004 | Howard et al. |
| 2004/0267385 A1 | 12/2004 | Lingemann |
| 2004/0267395 A1 | 12/2004 | Discenzo et al. |
| 2004/0267790 A1 | 12/2004 | Pak et al. |
| 2005/0005249 A1 | 1/2005 | Hill et al. |
| 2005/0007249 A1 | 1/2005 | Eryurek et al. |
| 2005/0010759 A1 | 1/2005 | Wakiyama |
| 2005/0033707 A1 | 2/2005 | Ehlers et al. |
| 2005/0034023 A1 | 2/2005 | Maturana et al. |
| 2005/0040247 A1 | 2/2005 | Pouchak |
| 2005/0040250 A1 | 2/2005 | Wruck |
| 2005/0041033 A1 | 2/2005 | Hilts et al. |
| 2005/0041633 A1 | 2/2005 | Roeser et al. |
| 2005/0046584 A1 | 3/2005 | Breed |
| 2005/0051168 A1 | 3/2005 | DeVries et al. |
| 2005/0054381 A1 | 3/2005 | Lee et al. |
| 2005/0055427 A1 | 3/2005 | Frutiger et al. |
| 2005/0068978 A1 | 3/2005 | Sexton et al. |
| 2005/0073789 A1 | 4/2005 | Tanis |
| 2005/0076150 A1 | 4/2005 | Lee et al. |
| 2005/0080879 A1 | 4/2005 | Kim et al. |
| 2005/0081156 A1 | 4/2005 | Clark et al. |
| 2005/0081157 A1 | 4/2005 | Clark et al. |
| 2005/0090915 A1 | 4/2005 | Gelwitz |
| 2005/0096872 A1 | 5/2005 | Blevins et al. |
| 2005/0097478 A1 | 5/2005 | Killian et al. |
| 2005/0103874 A1 | 5/2005 | Erdman |
| 2005/0109048 A1 | 5/2005 | Lee |
| 2005/0116023 A1 | 6/2005 | Amundson et al. |
| 2005/0118996 A1 | 6/2005 | Lee et al. |
| 2005/0119765 A1 | 6/2005 | Bergman |
| 2005/0119766 A1 | 6/2005 | Amundson et al. |
| 2005/0119771 A1 | 6/2005 | Amundson et al. |
| 2005/0119793 A1 | 6/2005 | Amundson et al. |
| 2005/0119794 A1 | 6/2005 | Amundson et al. |
| 2005/0120012 A1 | 6/2005 | Poth et al. |
| 2005/0125495 A1 | 6/2005 | Tjong et al. |
| 2005/0143138 A1 | 6/2005 | Lee et al. |
| 2005/0145705 A1 | 7/2005 | Shah et al. |
| 2005/0150967 A1 | 7/2005 | Chapman, Jr. et al. |
| 2005/0154494 A1 | 7/2005 | Ahmed |
| 2005/0159848 A1 | 7/2005 | Shah et al. |
| 2005/0159924 A1 | 7/2005 | Shah et al. |
| 2005/0161517 A1 | 7/2005 | Helt et al. |
| 2005/0166610 A1 | 8/2005 | Jayanth |
| 2005/0176410 A1 | 8/2005 | Brooking et al. |
| 2005/0182498 A1* | 8/2005 | Landou et al. .................. 700/20 |
| 2005/0192727 A1 | 9/2005 | Shostak et al. |
| 2005/0193155 A1 | 9/2005 | Fujita |
| 2005/0198040 A1 | 9/2005 | Cohen et al. |
| 2005/0223339 A1 | 10/2005 | Lee |
| 2005/0229610 A1 | 10/2005 | Park et al. |
| 2005/0235661 A1 | 10/2005 | Pham |
| 2005/0235662 A1 | 10/2005 | Pham |
| 2005/0235663 A1 | 10/2005 | Pham |
| 2005/0240312 A1 | 10/2005 | Terry et al. |
| 2005/0256591 A1 | 11/2005 | Rule et al. |
| 2005/0256935 A1 | 11/2005 | Overstreet et al. |
| 2005/0258257 A1 | 11/2005 | Thurman, Jr. et al. |
| 2005/0270151 A1 | 12/2005 | Winick |
| 2005/0278071 A1 | 12/2005 | Durham, III |
| 2005/0280364 A1 | 12/2005 | Omura et al. |
| 2005/0281368 A1 | 12/2005 | Droba et al. |
| 2005/0288823 A1 | 12/2005 | Hesse et al. |
| 2006/0006244 A1 | 1/2006 | Morrow et al. |
| 2006/0009861 A1 | 1/2006 | Bonasla |
| 2006/0009863 A1 | 1/2006 | Lingemann |
| 2006/0021358 A1 | 2/2006 | Nallapa |
| 2006/0021359 A1 | 2/2006 | Hur et al. |
| 2006/0030954 A1 | 2/2006 | Bergman et al. |
| 2006/0036350 A1 | 2/2006 | Bohrer et al. |
| 2006/0036952 A1 | 2/2006 | Yang |
| 2006/0041898 A1 | 2/2006 | Potyrailo et al. |
| 2006/0045107 A1 | 3/2006 | Kucenas et al. |
| 2006/0048064 A1 | 3/2006 | Vronay |
| 2006/0058924 A1 | 3/2006 | Shah |
| 2006/0063523 A1 | 3/2006 | McFarland et al. |
| 2006/0090142 A1 | 4/2006 | Glasgow et al. |
| 2006/0090483 A1 | 5/2006 | Kim et al. |
| 2006/0091227 A1 | 5/2006 | Attridge, Jr. |
| 2006/0092977 A1 | 5/2006 | Bai et al. |
| 2006/0106791 A1 | 5/2006 | Morrow et al. |
| 2006/0108432 A1 | 5/2006 | Mattheis |
| 2006/0111816 A1 | 5/2006 | Spalink et al. |
| 2006/0130497 A1 | 6/2006 | Kang et al. |
| 2006/0144055 A1 | 7/2006 | Ahn |
| 2006/0144232 A1 | 7/2006 | Kang et al. |
| 2006/0149414 A1 | 7/2006 | Archacki, Jr. et al. |
| 2006/0150027 A1 | 7/2006 | Paden |
| 2006/0153247 A1 | 7/2006 | Stumer |
| 2006/0155398 A1 | 7/2006 | Hoffberg et al. |
| 2006/0158051 A1 | 7/2006 | Bartlett et al. |
| 2006/0159007 A1 | 7/2006 | Frutiger et al. |
| 2006/0168522 A1 | 7/2006 | Bala |
| 2006/0185818 A1 | 8/2006 | Garozzo |
| 2006/0186214 A1 | 8/2006 | Simon et al. |
| 2006/0190138 A1 | 8/2006 | Stone et al. |
| 2006/0192021 A1 | 8/2006 | Schultz et al. |
| 2006/0196953 A1 | 9/2006 | Simon et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0202978 A1 | 9/2006 | Lee et al. |
| 2006/0206220 A1 | 9/2006 | Amundson |
| 2006/0209208 A1 | 9/2006 | Kim et al. |
| 2006/0212194 A1 | 9/2006 | Breed |
| 2006/0219799 A1 | 10/2006 | Schultz et al. |
| 2006/0229090 A1 | 10/2006 | LaDue |
| 2006/0235548 A1 | 10/2006 | Gaudette |
| 2006/0236351 A1 | 10/2006 | Ellerbrock et al. |
| 2006/0239296 A1 | 10/2006 | Jinzaki et al. |
| 2006/0248233 A1 | 11/2006 | Park et al. |
| 2006/0250578 A1 | 11/2006 | Pohl et al. |
| 2006/0250979 A1 | 11/2006 | Gauweller et al. |
| 2006/0267756 A1 | 11/2006 | Kates |
| 2006/0276917 A1 | 12/2006 | Li et al. |
| 2007/0005191 A1 | 1/2007 | Sloup et al. |
| 2007/0008116 A1 | 1/2007 | Bergman et al. |
| 2007/0012052 A1 | 1/2007 | Butler et al. |

| Pub. No. | Date | Inventor | Pub. No. | Date | Inventor |
|---|---|---|---|---|---|
| 2007/0013534 A1 | 1/2007 | DiMaggio | 2007/0257120 A1 | 11/2007 | Chapman, Jr. et al. |
| 2007/0014233 A1 | 1/2007 | Oguro et al. | 2007/0260782 A1 | 11/2007 | Shaikli |
| 2007/0016311 A1 | 1/2007 | Bergman et al. | 2007/0260978 A1 | 11/2007 | Oh et al. |
| 2007/0016476 A1 | 1/2007 | Hoffberg et al. | 2007/0266329 A1 | 11/2007 | Gaudette |
| 2007/0019683 A1 | 1/2007 | Kryzyanowski | 2007/0271521 A1 | 11/2007 | Harriger et al. |
| 2007/0025368 A1 | 2/2007 | Ha et al. | 2007/0274093 A1 | 11/2007 | Haim et al. |
| 2007/0032909 A1 | 2/2007 | Tolbert, Jr. et al. | 2007/0277013 A1 | 11/2007 | Rexha et al. |
| 2007/0033310 A1 | 2/2007 | Kweon | 2007/0278320 A1 | 12/2007 | Lunacek et al. |
| 2007/0035255 A1 | 2/2007 | Shuster et al. | 2007/0284452 A1 | 12/2007 | Butler et al. |
| 2007/0040040 A1 | 2/2007 | Mueller | 2007/0299857 A1 | 12/2007 | Gwozdz et al. |
| 2007/0043477 A1 | 2/2007 | Ehlers et al. | 2007/0300064 A1 | 12/2007 | Isaacs et al. |
| 2007/0043478 A1* | 2/2007 | Ehlers et al. .............. 700/276 | 2008/0003845 A1 | 1/2008 | Hong et al. |
| 2007/0045429 A1 | 3/2007 | Chapman, Jr. et al. | 2008/0004727 A1 | 1/2008 | Glanzer et al. |
| 2007/0045431 A1 | 3/2007 | Chapman, Jr. et al. | 2008/0005428 A1 | 1/2008 | Maul et al. |
| 2007/0045442 A1 | 3/2007 | Chapman, Jr. et al. | 2008/0006709 A1 | 1/2008 | Ashworth et al. |
| 2007/0051818 A1 | 3/2007 | Atlas | 2008/0029610 A1 | 2/2008 | Nichols |
| 2007/0053513 A1 | 3/2007 | Hoffberg | 2008/0031147 A1 | 2/2008 | Fieremans et al. |
| 2007/0055407 A1 | 3/2007 | Goldberg et al. | 2008/0040351 A1 | 2/2008 | Jin et al. |
| 2007/0055757 A1 | 3/2007 | Mairs et al. | 2008/0048045 A1 | 2/2008 | Butler et al. |
| 2007/0067062 A1 | 3/2007 | Mairs et al. | 2008/0048046 A1 | 2/2008 | Wagner et al. |
| 2007/0067496 A1 | 3/2007 | Deiretsbacher et al. | 2008/0054082 A1 | 3/2008 | Evans et al. |
| 2007/0073973 A1 | 3/2007 | Hazay | 2008/0055190 A1 | 3/2008 | Lee |
| 2007/0080235 A1 | 4/2007 | Fulton, Jr. | 2008/0056722 A1 | 3/2008 | Hendrix et al. |
| 2007/0083721 A1 | 4/2007 | Grinspan | 2008/0057872 A1 | 3/2008 | McFarland et al. |
| 2007/0084937 A1 | 4/2007 | Ahmed | 2008/0057931 A1 | 3/2008 | Nass et al. |
| 2007/0088883 A1 | 4/2007 | Wakabayashi | 2008/0058996 A1 | 3/2008 | Sachdev et al. |
| 2007/0089090 A1 | 4/2007 | Riedl et al. | 2008/0059682 A1 | 3/2008 | Cooley et al. |
| 2007/0090199 A1 | 4/2007 | Hull et al. | 2008/0062892 A1 | 3/2008 | Dodgen et al. |
| 2007/0093226 A1 | 4/2007 | Foltyn et al. | 2008/0063006 A1 | 3/2008 | Nichols |
| 2007/0097993 A1 | 5/2007 | Bojahra et al. | 2008/0065926 A1 | 3/2008 | Poth et al. |
| 2007/0102149 A1 | 5/2007 | Kates | 2008/0072704 A1 | 3/2008 | Clark et al. |
| 2007/0109114 A1 | 5/2007 | Farley et al. | 2008/0073440 A1 | 3/2008 | Butler et al. |
| 2007/0109975 A1 | 5/2007 | Reckamp et al. | 2008/0077884 A1 | 3/2008 | Patitucci |
| 2007/0113247 A1 | 5/2007 | Kwak | 2008/0077886 A1 | 3/2008 | Eichner |
| 2007/0114291 A1 | 5/2007 | Pouchak | 2008/0082767 A1 | 4/2008 | Nulkar et al. |
| 2007/0119957 A1 | 5/2007 | Kates | 2008/0083009 A1 | 4/2008 | Kaler et al. |
| 2007/0119958 A1 | 5/2007 | Kates | 2008/0083834 A1 | 4/2008 | Krebs et al. |
| 2007/0129820 A1 | 6/2007 | Glanzer et al. | 2008/0097651 A1 | 4/2008 | Shah et al. |
| 2007/0129825 A1 | 6/2007 | Kargenian | 2008/0104189 A1 | 5/2008 | Baker et al. |
| 2007/0129826 A1 | 6/2007 | Kreidler et al. | 2008/0114500 A1 | 5/2008 | Hull et al. |
| 2007/0129917 A1 | 6/2007 | Blevins et al. | 2008/0120335 A1 | 5/2008 | Dolgoff |
| 2007/0130834 A1 | 6/2007 | Kande et al. | 2008/0121729 A1 | 5/2008 | Gray |
| 2007/0130969 A1 | 6/2007 | Peterson et al. | 2008/0128523 A1 | 6/2008 | Hoglund et al. |
| 2007/0131784 A1 | 6/2007 | Garozzo et al. | 2008/0129475 A1 | 6/2008 | Breed et al. |
| 2007/0135692 A1 | 6/2007 | Hwang et al. | 2008/0133033 A1 | 6/2008 | Wolff et al. |
| 2007/0135946 A1 | 6/2007 | Sugiyama et al. | 2008/0133060 A1 | 6/2008 | Hoglund et al. |
| 2007/0136669 A1 | 6/2007 | Kwon et al. | 2008/0133061 A1 | 6/2008 | Hoglund et al. |
| 2007/0136687 A1 | 6/2007 | Pak | 2008/0134087 A1 | 6/2008 | Hoglund et al. |
| 2007/0138307 A1 | 6/2007 | Khoo | 2008/0134098 A1 | 6/2008 | Hoglund et al. |
| 2007/0138308 A1 | 6/2007 | Schultz et al. | 2008/0148098 A1 | 6/2008 | Chen |
| 2007/0143704 A1 | 6/2007 | Laird-McConnell | 2008/0161977 A1 | 7/2008 | Takach et al. |
| 2007/0143707 A1 | 6/2007 | Yun et al. | 2008/0161978 A1 | 7/2008 | Shah |
| 2007/0157016 A1 | 7/2007 | Dayan et al. | 2008/0168255 A1 | 7/2008 | Abou-Emara et al. |
| 2007/0158442 A1 | 7/2007 | Chapman, Jr. et al. | 2008/0168356 A1 | 7/2008 | Eryurek et al. |
| 2007/0168887 A1 | 7/2007 | Lee | 2008/0183335 A1 | 7/2008 | Poth et al. |
| 2007/0177505 A1 | 8/2007 | Charrua et al. | 2008/0184059 A1 | 7/2008 | Chen |
| 2007/0191024 A1 | 8/2007 | Kim et al. | 2008/0185976 A1 | 8/2008 | Dickey et al. |
| 2007/0192731 A1 | 8/2007 | Townsend et al. | 2008/0186160 A1 | 8/2008 | Kim et al. |
| 2007/0204637 A1 | 9/2007 | Fujii et al. | 2008/0192649 A1 | 8/2008 | Pyeon et al. |
| 2007/0205297 A1 | 9/2007 | Finkam et al. | 2008/0195254 A1 | 8/2008 | Jung et al. |
| 2007/0205916 A1 | 9/2007 | Blom et al. | 2008/0195581 A1 | 8/2008 | Ashmore et al. |
| 2007/0208461 A1 | 9/2007 | Chase | 2008/0195687 A1 | 8/2008 | Jung et al. |
| 2007/0208549 A1 | 9/2007 | Blevins et al. | 2008/0198036 A1 | 8/2008 | Songkakul et al. |
| 2007/0213853 A1 | 9/2007 | Glanzer et al. | 2008/0215987 A1 | 9/2008 | Alexander et al. |
| 2007/0219645 A1 | 9/2007 | Thomas et al. | 2008/0217418 A1 | 9/2008 | Helt et al. |
| 2007/0220301 A1 | 9/2007 | Brundridge et al. | 2008/0217419 A1 | 9/2008 | Ehlers et al. |
| 2007/0220907 A1 | 9/2007 | Ehlers | 2008/0223944 A1 | 9/2008 | Helt et al. |
| 2007/0223500 A1 | 9/2007 | Lee et al. | 2008/0235611 A1 | 9/2008 | Fraley et al. |
| 2007/0225868 A1 | 9/2007 | Terlson et al. | 2008/0256475 A1 | 10/2008 | Amundson et al. |
| 2007/0225869 A1 | 9/2007 | Amundson et al. | 2008/0264085 A1 | 10/2008 | Perry et al. |
| 2007/0233323 A1 | 10/2007 | Wiemeyer et al. | 2008/0272934 A1 | 11/2008 | Wang et al. |
| 2007/0236156 A1 | 10/2007 | Lys et al. | 2008/0281472 A1 | 11/2008 | Podgomy et al. |
| 2007/0237032 A1 | 10/2007 | Rhee et al. | 2008/0294274 A1 | 11/2008 | Laberge et al. |
| 2007/0238413 A1 | 10/2007 | Coutts | 2008/0294932 A1 | 11/2008 | Oshins et al. |
| 2007/0239658 A1 | 10/2007 | Cunningham et al. | 2009/0001180 A1 | 1/2009 | Siddaramanna et al. |
| 2007/0240226 A1 | 10/2007 | Song et al. | 2009/0001182 A1 | 1/2009 | Siddaramanna et al. |
| 2007/0241203 A1 | 10/2007 | Wagner et al. | 2009/0049847 A1 | 2/2009 | Butler et al. |
| 2007/0242058 A1 | 10/2007 | Yamada | 2009/0052105 A1 | 2/2009 | Soleimani et al. |
| 2007/0245306 A1 | 10/2007 | Dameshek et al. | 2009/0057424 A1 | 3/2009 | Sullivan et al. |

| | | |
|---|---|---|
| 2009/0057425 A1 | 3/2009 | Sullivan et al. |
| 2009/0065597 A1 | 3/2009 | Garozzo et al. |
| 2009/0094506 A1 | 4/2009 | Lakkis |
| 2009/0105846 A1 | 4/2009 | Hesse et al. |
| 2009/0113037 A1 | 4/2009 | Pouchak |
| 2009/0119092 A1 | 5/2009 | Balasubramanyan |
| 2009/0132091 A1 | 5/2009 | Chambers et al. |
| 2009/0140056 A1 | 6/2009 | Leen |
| 2009/0140057 A1 | 6/2009 | Leen |
| 2009/0140058 A1 | 6/2009 | Koster et al. |
| 2009/0140061 A1 | 6/2009 | Schultz et al. |
| 2009/0140062 A1 | 6/2009 | Amundson et al. |
| 2009/0140063 A1 | 6/2009 | Koster et al. |
| 2009/0140064 A1 | 6/2009 | Schultz et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0143918 A1 | 6/2009 | Amundson et al. |
| 2009/0157529 A1 | 6/2009 | Ehlers et al. |
| 2009/0195349 A1 | 8/2009 | Frader-Thompson |
| 2009/0198810 A1 | 8/2009 | Bayer et al. |
| 2009/0245278 A1 | 10/2009 | Kee |
| 2009/0257431 A1 | 10/2009 | Ramanathan et al. |
| 2009/0259785 A1 | 10/2009 | Perry et al. |
| 2009/0261174 A1 | 10/2009 | Butler et al. ............... 236/51 |
| 2009/0261767 A1 | 10/2009 | Butler et al. |
| 2009/0266904 A1 | 10/2009 | Cohen |
| 2009/0267540 A1 | 10/2009 | Chemel et al. |
| 2009/0271336 A1 | 10/2009 | Franks |
| 2009/0287736 A1 | 11/2009 | Shike et al. |
| 2010/0011437 A1 | 1/2010 | Courtney |
| 2010/0023865 A1 | 1/2010 | Fulker et al. |
| 2010/0050075 A1 | 2/2010 | Thorson et al. |
| 2010/0050108 A1 | 2/2010 | Mirza |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070907 A1 | 3/2010 | Harrod et al. |
| 2010/0073159 A1 | 3/2010 | Schmickley et al. |
| 2010/0076605 A1 | 3/2010 | Harrod et al. |
| 2010/0100253 A1 | 4/2010 | Fausak et al. |
| 2010/0101854 A1 | 4/2010 | Wallaert et al. |
| 2010/0102136 A1 | 4/2010 | Hadzidedic et al. |
| 2010/0102948 A1 | 4/2010 | Grohman et al. |
| 2010/0102973 A1 | 4/2010 | Grohman et al. |
| 2010/0106305 A1 | 4/2010 | Pavlak et al. |
| 2010/0106307 A1 | 4/2010 | Grohman et al. |
| 2010/0106308 A1 | 4/2010 | Filbeck et al. |
| 2010/0106309 A1 | 4/2010 | Grohman et al. |
| 2010/0106310 A1 | 4/2010 | Grohman |
| 2010/0106311 A1 | 4/2010 | Wallaert |
| 2010/0106312 A1 | 4/2010 | Grohman et al. |
| 2010/0106313 A1 | 4/2010 | Grohman et al. |
| 2010/0106314 A1 | 4/2010 | Grohman et al. |
| 2010/0106315 A1 | 4/2010 | Grohman |
| 2010/0106316 A1 | 4/2010 | Curry et al. |
| 2010/0106317 A1 | 4/2010 | Grohman |
| 2010/0106318 A1 | 4/2010 | Grohman et al. |
| 2010/0106319 A1 | 4/2010 | Grohman et al. |
| 2010/0106320 A1 | 4/2010 | Grohman et al. |
| 2010/0106321 A1 | 4/2010 | Hadzidedic |
| 2010/0106322 A1 | 4/2010 | Grohman |
| 2010/0106323 A1 | 4/2010 | Wallaert et al. |
| 2010/0106324 A1 | 4/2010 | Grohman |
| 2010/0106325 A1 | 4/2010 | Grohman |
| 2010/0106326 A1 | 4/2010 | Grohman |
| 2010/0106327 A1 | 4/2010 | Grohman et al. |
| 2010/0106329 A1 | 4/2010 | Grohman |
| 2010/0106330 A1 | 4/2010 | Grohman |
| 2010/0106333 A1 | 4/2010 | Grohman et al. |
| 2010/0106334 A1 | 4/2010 | Grohman et al. |
| 2010/0106787 A1 | 4/2010 | Grohman |
| 2010/0106809 A1 | 4/2010 | Grohman |
| 2010/0106810 A1 | 4/2010 | Grohman |
| 2010/0106814 A1 | 4/2010 | Hadzidedic et al. |
| 2010/0106815 A1 | 4/2010 | Grohman et al. |
| 2010/0106925 A1 | 4/2010 | Grohman et al. |
| 2010/0106957 A1 | 4/2010 | Grohman et al. |
| 2010/0107007 A1 | 4/2010 | Grohman et al. |
| 2010/0107070 A1 | 4/2010 | Devineni et al. |
| 2010/0107071 A1 | 4/2010 | Pavlak et al. |
| 2010/0107072 A1 | 4/2010 | Mirza et al. |
| 2010/0107073 A1 | 4/2010 | Wallaert |
| 2010/0107074 A1 | 4/2010 | Pavlak et al. |
| 2010/0107076 A1 | 4/2010 | Grohman |
| 2010/0107083 A1 | 4/2010 | Grohman |
| 2010/0107103 A1 | 4/2010 | Wallaert |
| 2010/0107109 A1 | 4/2010 | Filbeck et al. |
| 2010/0107110 A1 | 4/2010 | Mirza |
| 2010/0107111 A1 | 4/2010 | Mirza |
| 2010/0107112 A1 | 4/2010 | Jennings et al. |
| 2010/0107232 A1 | 4/2010 | Grohman et al. |
| 2010/0115364 A1 | 5/2010 | Grohman |
| 2010/0142526 A1 | 6/2010 | Wong |
| 2010/0145629 A1 | 6/2010 | Botich et al. |
| 2010/0168924 A1 | 7/2010 | Tessier et al. |
| 2010/0169419 A1 | 7/2010 | DeVilbiss et al. |
| 2010/0179696 A1 | 7/2010 | Grohman et al. |
| 2010/0211546 A1 | 8/2010 | Grohman et al. |
| 2010/0241245 A1 | 9/2010 | Wiemeyer et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301772 A1 | 12/2010 | Chemel et al. |
| 2010/0301773 A1 | 12/2010 | Chemel et al. |
| 2010/0301774 A1 | 12/2010 | Chemel et al. |
| 2010/0305761 A1 | 12/2010 | Remsburg |
| 2010/0314458 A1 | 12/2010 | Votaw et al. |
| 2010/0319362 A1 | 12/2010 | Hisaoka |
| 2011/0001436 A1 | 1/2011 | Chemel et al. |
| 2011/0001438 A1 | 1/2011 | Chemel et al. |
| 2011/0004823 A1 | 1/2011 | Wallaert |
| 2011/0004824 A1 | 1/2011 | Thorson et al. |
| 2011/0007016 A1 | 1/2011 | Mirza et al. |
| 2011/0007017 A1 | 1/2011 | Wallaert |
| 2011/0010620 A1 | 1/2011 | Mirza et al. |
| 2011/0010621 A1 | 1/2011 | Wallaert |
| 2011/0010652 A1 | 1/2011 | Wallaert |
| 2011/0010653 A1 | 1/2011 | Wallaert |
| 2011/0010660 A1 | 1/2011 | Thorson et al. |
| 2011/0032932 A2 | 2/2011 | Pyeon et al. |
| 2011/0040785 A1 | 2/2011 | Steenberg et al. |
| 2011/0061014 A1 | 3/2011 | Frader-Thompson et al. |
| 2011/0063126 A1 | 3/2011 | Kennedy et al. |
| 2012/0012662 A1 | 1/2012 | Leen et al. |
| 2012/0046792 A1 | 2/2012 | Secor |
| 2012/0065805 A1 | 3/2012 | Montalvo |
| 2012/0116593 A1 | 5/2012 | Amundson et al. |
| 2012/0181010 A1 | 7/2012 | Schultz et al. |

FOREIGN PATENT DOCUMENTS

| | | |
|---|---|---|
| EP | 2241836 A1 | 10/2010 |
| EP | 2241837 A1 | 10/2010 |
| WO | 02056540 A2 | 7/2002 |
| WO | 2008100641 A1 | 8/2008 |

OTHER PUBLICATIONS

Related case U.S. Appl. No. 29/345,748, filed Oct. 21, 2009 to Timothy Wallaert et al., entitled "Thin Cover Plate for an Electronic System Controller".

Related case U.S. Appl. No. 29/345,747, filed Oct. 21, 2009 to Timothy Wallaert et al., entitled "Thin Cover Plate for an Electronic System Controller".

Related case U.S. Appl. No. 12/603,508, filed Oct. 21, 2009 to Wojciech Grohman, entitled "Alarm and Diagnostics System and Method for a Distributed-Architecture Heating, Ventilation and Air Conditioning Network".

Related case U.S. Appl. No. 12/603,450, filed Oct. 21, 2009 to Wojciech Grohman, entitled "Alarm and Diagnostics System and Method for a Distributed-Architecture Heating, Ventilation and Air Conditioning Network".
Related case U.S. Appl. No. 12/603,382, filed Oct. 21, 2009 to Wojciech Grohman, entitled "Device Abstraction System and Method for a Distributed-Architecture Heating, Ventilation and Air Conditioning System".
Related case U.S. Appl. No. 12/603,504, filed Oct. 21, 2009 to Amanda Filbeck et al., entitled "System and Method of Use for a User Interface Dashboard of a Heating, Ventilation and Air Conditioning Network".
Related case U.S. Appl. No. 12/603,449, filed Oct. 21, 2009 to Wojciech Grohman et al., entitled "System and Method of Use for a User Interface Dashboard of a Heating, Ventilation and Air Conditioning Network".
Related case U.S. Appl. No. 12/603,460, filed Oct. 21, 2009 to Wojciech Grohman et al., entitled "System and Method of Use for a User Interface Dashboard of a Heating, Ventilation and Air Conditioning Network".
Related case U.S. Appl. No. 12/603,526, filed Oct. 21, 2009 to Wojciech Grohman et al., entitled "Communication Protocol System and Methof for a Distributed-Architecture Heating, Ventilation and Air Conditioning Network K".
Related case U.S. Appl. No. 12/603,532, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,475, filed Oct. 21, 2009 to Suresh Kumar Devineni et al., entitled "System and Method of Use for a User Interface Dashboard of a Heating, Ventilation and Air Conditioning Network".
Related case U.S. Appl. No. 12/603,362, filed Oct. 21, 2009 to Wojciech Grohman et al., entitled "Architecture Heating, Ventilation and Air Conditioning System".
Related case U.S. Appl. No. 12/603,473, filed Oct. 21, 2009 to Wojciech Grohman et al., entitled "System and Method for Zoning a Distributed-Architecture Heating, Ventilation and Air Conditioning Network".
Related case U.S. Appl. No. 12/603,407, filed Oct. 21, 2009 to Amanda Filbeck et al., entitled "System and Method for Zoning a Distributed-Architecture Heating, Ventilation and Air Conditioning Network".
Related case U.S. Appl. No. 12/603,496, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,482, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,488, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,495, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,497, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,431, filed Oct. 21, 2009 to Wojciech Grohman et al., entitled "General Control Technique in a Heating, Ventilation and Air Conditioning Network".
Related case U.S. Appl. No. 12/603,502, filed Oct. 21, 2009 to Wojciech Grohman et al., entitled "System and Method of Use for a User Interface Dashboard of a Heating, Ventilation and Air Conditioning Network".
Related case U.S. Appl. No. 12/603,489, filed Oct. 21, 2009 to Wojciech Grohman, entitled "System and Method for Zoning a Distributed-Architecture Heating, Ventilation and Air Conditioning Network".
Related case U.S. Appl. No. 12/603,527, filed Oct. 21, 2009 to Darko Hadzidedic et al., entitled "Memory Recovery Scheme and Data Structure in a Heating, Ventilation and Air Conditioning Network".
Related case U.S. Appl. No. 12/603,479, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,536, filed Oct. 21, 2009 to Timothy Wallaert et al., entitled "Communication Protocol System and Method for a Distributed-Architecture Heating, Ventilation and Air Conditioning Network".
Related case U.S. Appl. No. 12/603,509, filed Oct. 21, 2009 to Timothy Wallaert et al., entitled "System and Method of Use for a User Interface Dashboard of a Heating, Ventilation and Air Conditioning Network".
Related case U.S. Appl. No. 12/603,512, filed Oct. 21, 2009 to Wojciech Grohman et al., entitled "Programming and Configuration in a Heating, Ventilation and Air Conditioning Network".
Related case U.S. Appl. No. 12/603,464, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,528, filed Oct. 21, 2009 to Wojciech Grohman et al., entitled "Memory Recovery Scheme and Data Structure in a Heating, Ventilation and Air Conditioning Network".
Related case U.S. Appl. No. 12/603,525, filed Oct. 21, 2009 to Wojciech Grohman et al., entitled "Method of Controlling Equipment in a Heating, Ventilation and Air Conditioning Network".
Related case U.S. Appl. No. 12/603,520, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,539, filed Oct. 21, 2009 to Darko Hadzidedic et al., entitled "Communication Protocol System and Method for a Distributed-Architecture Heating, Ventilation and Air Conditioning Networkk".
Related case U.S. Appl. No. 12/603,420, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,483, filed Oct. 21, 2009 to Darko Hadzidedic et al., entitled "Device Abstraction System and Method for a Distributed-Architecture Heating, Ventilation and Air Conditioning System".
Related case U.S. Appl. No. 12/603,514, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,515, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,490, filed Oct. 21, 2009 to Wojciech Grohman, entitled "System Recovery in a Heating, Ventilation and Air Conditioning Network".
Related case U.S. Appl. No. 12/603,523, filed Oct. 21, 2009 to Wojciech Grohman et al., entitled "Alarm and Diagnostics System and Method for a Distributed-Architecture Heating, Ventilation and Air Conditioning".
Related case U.S. Appl. No. 12/603,547, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,531, filed Oct. 21, 2009 to Wojciech Grohman, entitled "Memory Recovery Scheme and Data Structure in a Heating, Ventilation and Air Conditioning Network".
Related case U.S. Appl. No. 12/603,555, filed Oct. 21, 2009 to Wojciech Grohman, entitled "Communication Protocol System and Method for a Distributed-Architecture Heating, Ventilation and Air Conditioning Network".

Related case U.S. Appl. No. 12/603,562, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,566, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,451, filed Oct. 21, 2009 to Timothy Wallaert, entitled "Alarm and Diagnostics System and Method for a Distributed-Architecture Heating, Ventilation and Air Conditioning Network".
Related case U.S. Appl. No. 12/603,553, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,487, filed Oct. 21, 2009 to Wojciech Grohman, entitled "System Recovery in a Heating, Ventilation and Air Conditioning Network".
Related case U.S. Appl. No. 12/603,558, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,468, filed Oct. 21, 2009 to Wojciech Grohman et al., entitled "Programming and Configuration in a Heating, Ventilation and Air Conditioning Network".
Related case U.S. Appl. No. 12/603,560, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,519, filed Oct. 21, 2009 to Thomas Pavlak, entitled "System and Method of Use for a User Interface Dashboard of a Heating, Ventilation and Air Conditioning Network".
Related case U.S. Appl. No. 12/603,499, filed Oct. 21, 2009 to Jimmy Curry et al., entitled "Alarm and Diagnostics System and Method for a Distributed-Architechture Heating, Ventilation and Air Conditioning Network".
Gallas, B., et al., " Embedded Pentium ®Processor System Design for Windows CE," WESCON 1998, pp. 114-123.
"iView-100 Series (iView/iView-100-40) Handheld Controller User's Manual," ICP DAS, Mar. 2006, Version 2.0.
"Spectre™ Commercial Zoning System, Engineering Data," Lennox, Bulletin No. 210366E, Oct. 2002, 33 pages.
Sharma, A., "Design of Wireless Sensors Network for Building Management Systems," University of California-Berkley, 57 pages.
"Linux Programmer's Manual," UNIX Man Pages: Login (1) http://unixhelp.ed.ac.uk/CGI/man-cgi?login, Util-linux 1.6, Nov. 4, 1996, 4 pages.
Checket-Hanks, B., "Zoning Controls for Convenience's Sakes, High-End Residential Controls Move Into New Areas," Air Conditioning, Heating & Refrigeration News, ABI/Inform Global, Jun. 28, 2004, 3 pages.
Leeb, G., "A User Interface for Home-Net," IEEE Transactions on Consumer Electronics, vol. 40, Issue 4, Nov. 1994, pp. 897-902.
"IPMI-Intelligent Platform Management Interface Specification v1.5," Document Revision 1.1, Intel Hewlett-Packard NEC Dell, Feb. 20, 2002, 460 pages.
Nash, H., "Fire Alarm Systems for Health Care Facilities," IEEE Transactions on Industry Applications, vol. 1A-19, No. 5, Sep./ Oct. 1983, pp. 848-852.
Bruggeman, E., et al., "A Multifunction Home Control System," IEEE Transactions on Consumer Electronics, CE-29, Issue 1, 10 pages.
Fischer, H., et al., "Remote Building Management and DDc-Technology to Operate Distributed HVAC-Installations," The first International Telecommunications Energy Special Conference, TELESCON '94, Apr. 11-15, 1994, pp. 127-132.

\* cited by examiner

SYSTEM RECOVERY IN A HEATING, VENTILATION AND AIR CONDITIONING NETWORK

CROSS-REFERENCE TO RELATED APPLICATIONS

This application claims the benefit of U.S. Provisional Application Ser. No. 61/167,135, filed by Grohman, et al., on Apr. 6, 2009, entitled "Comprehensive HVAC Control System", and is a continuation-in-part application of application Ser. No. 12/258,659, filed by Grohman on Oct. 27, 2008, entitled "Apparatus and Method for Controlling an Environmental Conditioning Unit," both of which are commonly assigned with this application and incorporated herein by reference. This application is also related to the following U.S. patent applications, which are filed on even date herewith, commonly assigned with this application and incorporated herein by reference:

| Serial No. | Inventors | Title |
| --- | --- | --- |
| 12/603,464 | Grohman, et al. | "Alarm and Diagnostics System and Method for a Distributed-Architecture Heating, Ventilation and Air Conditioning Network" |
| 12/603,534 | Wallaert, et al. | "Flush Wall Mount Control Unit and In-Set Mounting Plate for a Heating, Ventilation and Air Conditioning System" |
| 12/603,449 | Thorson, et al. | "System and Method of Use for a User Interface Dashboard of a Heating, Ventilation and Air Conditioning Network" |
| 12/603,382 | Grohman | "Device Abstraction System and Method for a Distributed-Architecture Heating, Ventilation and Air Conditioning Network" |
| 12/603,526 | Grohman, et al. | "Communication Protocol System and Method for a Distributed-Architecture Heating, Ventilation and Air Conditioning Network" |
| 12/603,527 | Hadzidedic | "Memory Recovery Scheme and Data Structure in a Heating, Ventilation and Air Conditioning Network" |
| 12/603,490 | Grohman | "System Recovery in a Heating, Ventilation and Air Conditioning Network" |
| 12/603,473 | Grohman, et al. | "System and Method for Zoning a Distributed-Architecture Heating, Ventilation and Air Conditioning Network" |
| 12/603,525 | Grohman, et al. | "Method of Controlling Equipment in a Heating, Ventilation and Air Conditioning Network" |
| 12/603,512 | Grohman, et al. | "Programming and Configuration in a Heating, Ventilation and Air Conditioning Network" |
| 12/603,431 | Mirza, et al. | "General Control Techniques in a Heating, Ventilation and Air Conditioning Network" |

TECHNICAL FIELD

This application is directed, in general, to distributed-architecture heating, ventilation and air conditioning (HVAC) networks and, more specifically, to system recovery in HVAC networks.

BACKGROUND

Climate control systems, also referred to as HVAC systems (the two terms will be used herein interchangeably), are employed to regulate the temperature, humidity and air quality of premises, such as a residence, office, store, warehouse, vehicle, trailer, or commercial or entertainment venue. The most basic climate control systems either move air (typically by means of an air handler or, or more colloquially, a fan or blower), heat air (typically by means of a furnace) or cool air (typically by means of a compressor-driven refrigerant loop). A thermostat is typically included in the climate control systems to provide some level of automatic temperature control. In its simplest form, a thermostat turns the climate control system on or off as a function of a detected temperature. In a more complex form, a thermostat may take other factors, such as humidity or time, into consideration. Still, however, the operation of a thermostat remains turning the climate control system on or off in an attempt to maintain the temperature of the premises as close as possible to a desired setpoint temperature. Climate control systems as described above have been in wide use since the middle of the twentieth century.

SUMMARY

One aspect provides retrieving data for a subnet controller in an HVAC network. In an embodiment, a method includes reporting, by a device that is coupled to the subnet of the HVAC network, of a loss of internal memory settings, to the active subnet controller of the subnet. The method also includes recognizing the device by the active subnet controller. The method still further includes requesting at least one list of parameters from the device by the active subnet controller. The method yet still further includes employing an order of the at least one list of parameters as an order to convey corresponding stored values of these parameters to the device from the active subnet controller.

Another aspect provides a subnet controller that can retrieve data in an HVAC network. In an embodiment, the subnet controller includes a receiver that receives from a coupled device an indication of a loss of internal memory settings to the subnet controller in the HVAC. The subnet controller also includes a recognizer that can recognize the coupled device. The subnet controller further includes a requester that requests at least one list of parameters from the device at the behest of the subnet controller. The subnet controller yet still further includes a parameter retriever that employs an order of the at least one list of parameters to retrieve corresponding values of these parameters and convey these values, related to an order of the received parameters, to the coupled device.

Yet another aspect provides a method of memory recovery in an HVAC network. In an embodiment, the method includes determining whether an entire memory, correlating to stored parameters for a given set of devices, of an active subnet controller in the HVAC network is corrupted. If the entire memory is corrupted, each device of the given set of devices conveys to the active subnet controller: a) a full feature manifest, and b) a full parameter scan.

BRIEF DESCRIPTION

Reference is now made to the following descriptions taken in conjunction with the accompanying drawings, in which.

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose and perhaps able to repair itself, may require fewer, simpler repairs and may have a longer service life.

Figure 1:
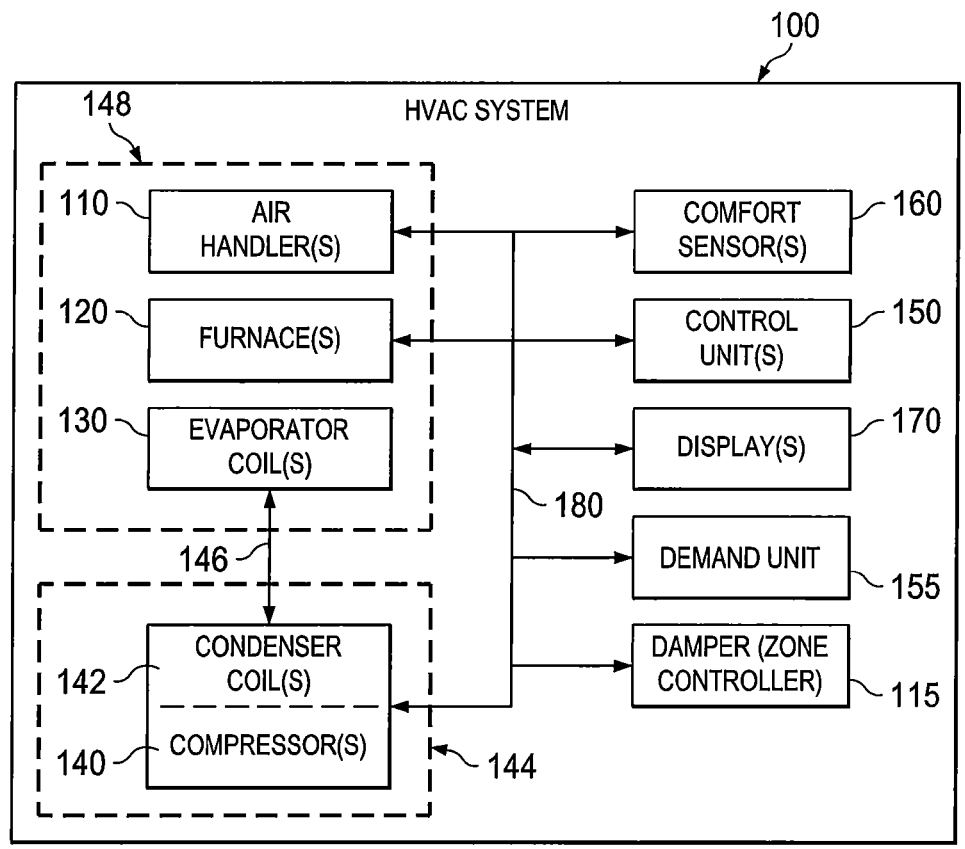
FIG. 1 is a high-level block diagram of an HVAC system within which a device abstraction system and method may be contained or carried out.

FIG. 1 is a high-level block diagram of an HVAC system, generally designated 100. The HVAC system may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In the context of a zoned system 100, the one or more dampers 115 may be referred to as zone controllers 115. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more compressors 140 and associated condenser coils 142, which are typically associated in one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units.

For convenience in the following discussion, a demand unit 155 is representative of the various units exemplified by the air handler 110, furnace 120, and compressor 140, and more generally includes an HVAC component that provides a service in response to control by the control unit 150. The service may be, e.g., heating, cooling, or air circulation. The demand unit 155 may provide more than one service, and if so, one service may be a primary service, and another service may be an ancillary service. For example, for a cooling unit that also circulates air, the primary service may be cooling, and the ancillary service may be air circulation (e.g. by a blower).

The demand unit 155 may have a maximum service capacity associated therewith. For example, the furnace 120 may have a maximum heat output (often expressed in terms of British Thermal Units, or BTU), or a blower may have a maximum airflow capacity (often expressed in terms of cubic feet per minute, or CFM). In some cases, the addressable unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus, couples the one or more air handlers 110, the one or more furnaces 120, the one or more evaporator coils 130, the one or more condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages.

Figure 2:
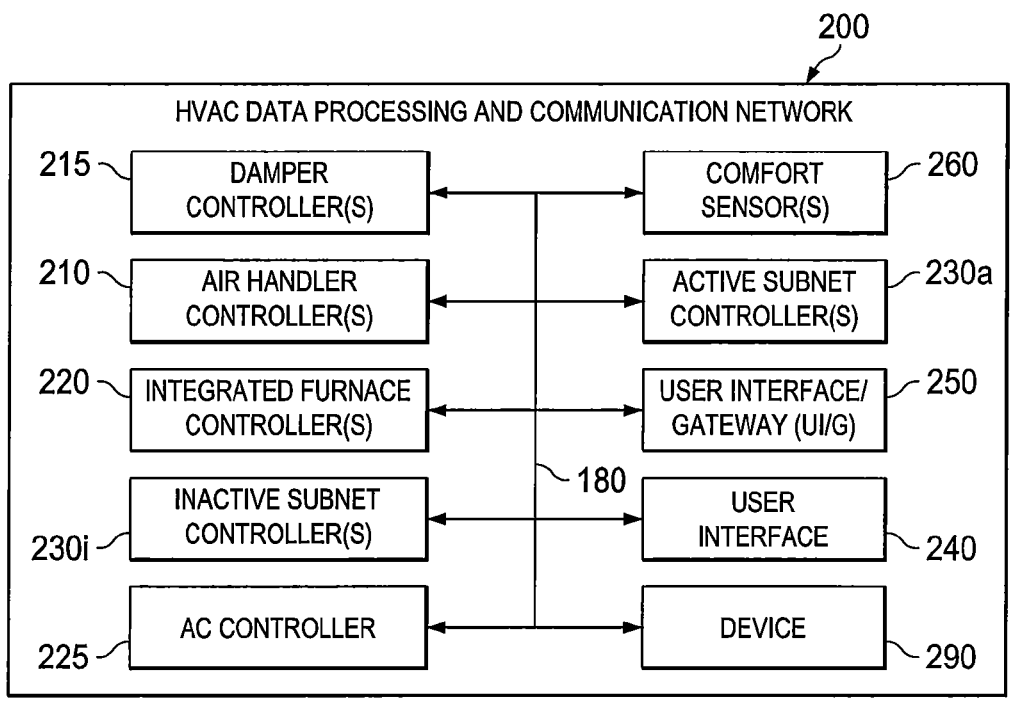
FIG. 2 is a high-level block diagram of one embodiment of an HVAC data processing and communication network 200.

FIG. 2 is a high-level block diagram of one embodiment of an HVAC data processing and communication network 200 that may be employed in the HVAC system 100 of FIG. 1. One or more air handler controllers ("AHCs") 210 may be associated with the one or more air handlers 110 of FIG. 1. One or more integrated furnace controllers ("IFCs") 220 may be associated with the one or more furnaces 120. One or more damper controller modules 215, also referred to as a zone controller module 215, may be associated with the one or more dampers 114 the interface the one or more dampers to the data bus 180. One or more AC controllers 225 may be associated with one or more evaporator coils 130 and one or more condenser coils 142 and compressors 140 of FIG. 1. The network 200 includes an active subnet controller ("aSC") 230a and an inactive subnet controller ("iSC") 230i. The aSC 230a is responsible for configuring and monitoring the system 100 and for implementation of heating, cooling, air quality, ventilation or any other functional algorithms therein. Two or more aSCs 230a may also be employed to divide the network 200 into subnetworks, or subnets, simplifying network configuration, communication and control. The iSC 230i is a subnet controller that does not actively control the network 200. In some embodiments, the iSC 230i listens to all messages passed over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane the subnet controller is referred to generally as an SC 230.

A user interface (UI) 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260 may provide an interface between the data bus 180 and each of the one or more comfort sensors 160.

Each of the components 210, 220, 225, 230a, 230i, 240, 250, 260 may include a general interface device configured to interface to the bus 180, as described below. (For ease of description any of the networked components, e.g., the components 210, 220, 225, 230a, 230i, 240, 250, 260, may be referred to generally herein as a device 290. In other words, the device 290 of FIG. 2 is a proxy for any of a furnace, a heat pump, a subnet controller, etc, and that device's associated interface means.) The data bus 180 in some embodiments is implemented using the Bosch CAN (Controller Area Network) specification, revision 2, and may be synonymously referred to herein as a residential serial bus (RSBus) 180. The data bus 180 provides communication between or among the aforementioned elements of the network 200. It should be understood that the use of the term "residential" is nonlimiting; the network 200 may be employed in any premises whatsoever, fixed or mobile. In wireless embodiments, the data bus 180 may be implemented, e.g., using Bluetooth™ or a similar wireless standard.

Figure 3A:
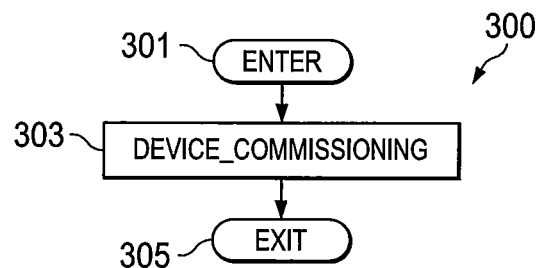
FIG. 3A is a diagram of a series of steps in an event sequence that depicts a device commissioning in an HVAC network having an active subnet controller.

Turning now to FIG. 3A, illustrated is a diagram 300 of a series of steps that occur in relation to a commissioning of the unit 155. The diagram 300 includes an enter state 301, a device commissioning state 303, and an exit state 305. The HVAC system 100 can be described as being partitioned into a plurality of subnets, each subnet controlled by its own active subnet controller 230a.

Device commissioning can generally be defined as setting operational parameters for a device in the network of the HVAC system, including its installation parameters. Generally, device commissioning 300 is used by the subnet controller 230 when it is active to: a) set operating "Installer Parameters" for a networked device, such as air handlers 110, (henceforth to be referred to collectively, for the sake of convenience, as the unit 155, although other devices are also contemplated), b) to load UI/Gs 240, 250 with names and settings of "Installer Parameters and Features" of the units 155, c) to configure replacement parts for the units 155, and d) to restore values of "Installer Parameters and Features" in units 155 if those "Parameters and Features" were lost due to memory corruption or any other event. Device commissioning is a process used in the HVAC system 100, either in a "configuration" mode or in a "verification" mode.

In the "configuration" mode, the unit 155 shares its information with the subnet controller 230a in an anticipation of being employable in the HVAC system 100, and an appropriate subnet. Generally, the commissioning process 300 provides a convenient way to change or restore functional parameters, both for the subnet controller 230a and the unit 155.

In both the "verification" mode and the "configuration" mode, the unit 155 is checked for memory errors or other configuration or programming errors. There are differences in device 260 behavior between the "configuration" mode and in the "verification" mode, to be detailed below.

The "subnet startup" mode programs the subnet controller 230 to be active. The "subnet startup" mode enables subnet communications, (i.e., communication within a subnet), and also deactivates a "link" sub-mode. A "link" mode may be generally defined as a mode that allows a number of subnets to work together on the same HVAC network 100, and that assigns subnet numbers for each subnet to allow this communication.

The "installer test" mode is employed when an installer installs and tests aspects and units 155 of the HVAC system 100. The "normal operations" mode is an ongoing operation of the units 155 of the HVAC system 100 in a normal use.

More specifically, the device commissioning state machine 300 can be employed with: a) the "configuration" mode, which is invoked when transitioning to the commissioning state from the "subnet startup mode" or "installer test" mode, or the "normal mode", or b) a "verification" mode. The "verification" mode is invoked when transitioning to the commissioning state from the "subnet startup" mode.

The following describes an illustrative embodiment of a process of commissioning 300 the HVAC unit 155, first for a "configuration" mode, and then for a "verification" mode. The process of commissioning differs from a "subnet startup," in that commissioning requires that the network configuration, including configuration and activation of subnet controllers 230, has already been completed before the commissioning 300 of the device 260 can start. Please note that there can be more than one subnet controller 230 on a subnet, but only subnet controller 230a is active at any one time.

In one embodiment, in order to enter into the state 320 of the process 300 in the "configuration" mode, the unit 155 receives either: a) an "aSC" ('active subnet controller') Device Assignment message", having "Assigned State" bits set to "Commissioning"; or b) a receipt of an "aSC Change State" message, with "New aSC State" bits set to "Commissioning," from the active subnet controller 230. For both "configuration" and "verification" modes, an "aSC Device Assignment" message can be generally regarded as a message that assigns the unit 155 to a particular active subnet controller 230a. For both "configuration" and "verification" modes, an "aSC Change State" message can be generally regarded as a message that starts and ends employment of the commissioning state diagram 300 for the units 155 and all other devices on the subnet.

In the state 320 in the configuration mode, all units 155 respond to the "aSC Device Assignment" message with their respective "Device Status" messages, indicating that the units 155 are now in commissioning process 300 due to their response to this previous message. For both "configuration" and "verification" modes, the "Device Status" message can be generally defined as message that informs the active subnet controller 230a of what actions are being taken by the unit 155 at a given time.

However, alternatively, in other embodiments, in the state 320 in the "configuration" mode, if the units 155 are instead busy, as indicated by "aSC Acknowledge" bits of the "Device Status" message sent to the subnet controller 230a set as a "Control Busy," the active subnet controller 230a will wait for the busy units 155 to clear their "aSC Acknowledge" bits before proceeding with further elements of the Commissioning 320 process. The units 155 then resend their "Device Status" messages as soon as they are no longer busy.

From this point on, all units 155 send their "Device Status" messages periodically and on any status change, both during and after the commissioning 300. If the unit 155 does not clear its "aSC Acknowledge" bits within a minute (indicating its control is no longer "busy"), the active subnet controller 230a sends an "Unresponsive Device2" alarm for each such unit 155. If in "configuration" mode, the active subnet controller 230a remains in the waiting mode indefinitely, until the unit 155 responds correctly, or the subnet is reset manually or after a timeout is reached. In "verification" mode the active subnet controller 230a proceeds further to exit the state.

In the "configuration" mode, each unit 155 remembers all of its optional sensors that are currently attached to it. Furthermore, each unit 155 may store a local copy in its non-volatile memory ("NVM") of all of any other unit features that it is dependent on. A unit 155 feature can be generally defined as any datum that is fixed and cannot be changed by the installer, serviceman or the home owner. Changing of a "Feature" value normally involves reprogramming of the units 155 firmware.

In at least some embodiments, a feature is something that is fixed value, that is hard-wired into a device. In other words, no installer or home owner can change it. Features are programmed into the unit 155 during a manufacturing or an assembly process. Features can be recovered in a home, during a Data non-volatile memory ("NVM") recovery substate of Commissioning state only—the recovery substate happens automatically and without installer or user intervention. In a further embodiment, parameters can be changed by the installers only. In a yet further embodiment, the HVAC system 100 employs "variables"—those can be changed by the installers and also the home owners.

In some embodiments, a "Parameter List" is normally a Feature that contains a special list of specific parameters included in the unit 155. Parameter values can be changed, and their state can be changed also (from enabled to disabled and vice-versa), but their presence is set once and for all in a given firmware version. Therefore, a list of Parameters (not their values) is also fixed, and is thus treated as a "Feature."

However, although elements of the "configuration" mode commissioning and "verification" mode commissioning are similar, when the active subnet controller 230 is in "verification" mode instead of in "configuration" mode, the active subnet controller 230a can exit commissioning 300 regardless of the value of the alarms of the units 155. However, alternatively, if the active subnet controller 230a is in "configuration" mode, the active subnet controller 230a will not exit from its commissioning state 300 for as long as at least one unit's 155 "aSC Acknowledge" flags are set to "Control Busy." In one embodiment of the "verification" mode, the active subnet controller 230a timeouts the installation and resets the subnet to default parameters.

In the "verification" mode, assuming the unit 155 operates with a non-corrupted (original or restored copy) NVM, each unit 155 checks any of its attached sensors to see if they match with the parameters that were present in a most recent configuration of the unit 155. In some embodiments, alarms are generated by the unit 155 for missing or malfunctioning sensors as soon as the faulty condition is detected, to be employed by the user interfaces and gateways present on the subnet to notify the installer or homeowner of the encountered problem. The unexpected absence of certain sensors may inhibit the operation of the unit 155 or the subnet. This is normally manifested by the signaling of the appropriate Service Bits in the Device Status message used by the active subnet controller 230a, to determine the operational viability or health of the subnet's systems.

In some embodiments, the device commissioning process 300 then transitions into a state 330, and then ends, upon either: a) the last unit 155 receiving all of unit 155 parameters that it is dependent on, when in "verification" mode; or b) upon a request by a user, when in "configuration" mode. The active subnet controller 230a then proceeds to ensure that no subnet unit 155 has its "aSC Acknowledge" flag set to a "Control Busy" state. The "aSC Acknowledge" flag not being set indicates that all of a non-volatile memory of a given unit 155 had been written to with the necessary parameters. If no "Control Busy" state is detected, the active subnet controller 230a then issues the "aSC Change State" message, which forces the unit 155 from a commissioning state to a non-commissioning state, in either a "configuration" or a "verification" mode. Then, after a period of time, for example for up to one minute, the active subnet controller 230 may begin with other functionality, continuing to send out an active system heartbeat, to be described below.

In some embodiments, when the unit 155 in the process 300 fails its NVM data integrity check in an "NVM Check State," and the active subnet controller is unable to perform NVM Recovery, the unit 155 instead employs its default data stored in its non-volatile (Flash) memory and/or uses default calculations to initialize the data dependent on other devices in the system. The other device data to be used for commissioning could have been obtained in either the "verification" or "configuration" mode. For data or other parameters that were not transferred or generated as part of that commissioning 300 session, default values are used.

In one embodiment, upon a detection of a system configuration error, such as a missing device whose features or parameters the unit 155 depends upon, it uses the locally stored copy of the other device's features that it depends upon, and ignores any potential feature value conflicts. In another embodiment, the unit 155 uses the locally stored copy of other parameters of the unit 155 that it depends on and ignores any potential dependent parameter value conflicts. In other words, the unit 155 employs a first installed parameter as a template for a second installed parameter on a second device. In a third embodiment, the unit 155 will change its parameter or feature values only if explicitly instructed by the active subnet controller 230 or the UI/G 240, 250.

Figure 3C:
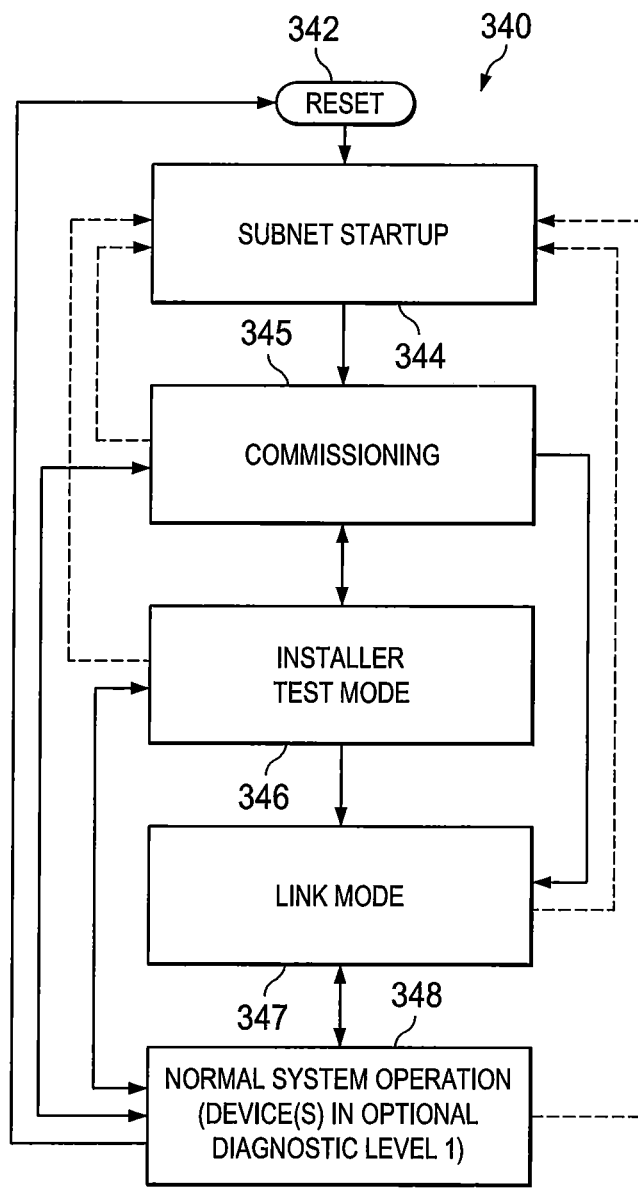
FIG. 3C is a diagram of the above series of steps of FIG. 3B to be followed by a subnet controller to synchronize with a device of the HVAC system.
Figure 3B:
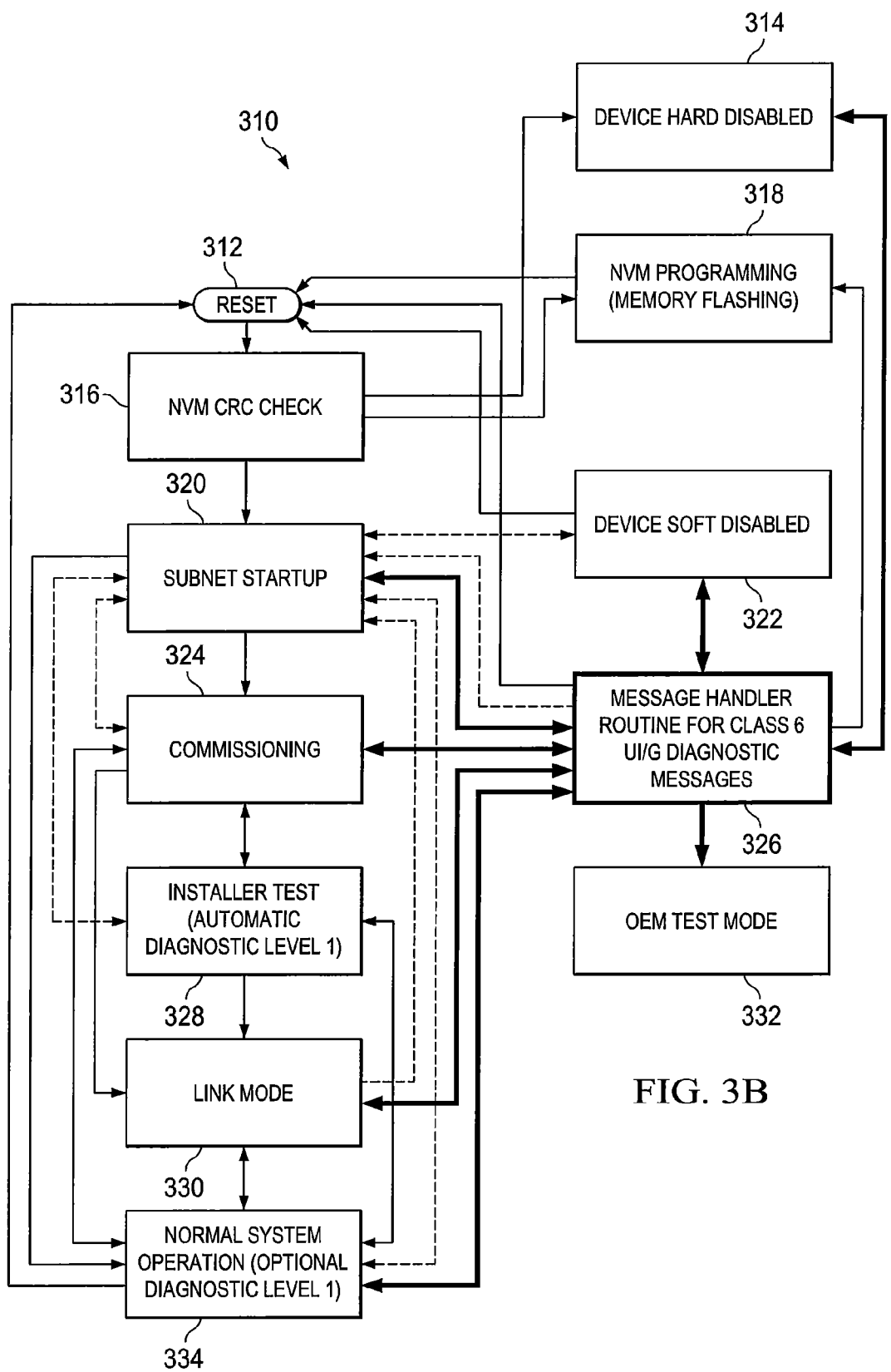
FIG. 3B is a diagram of a series of steps that occur in relation to a commissioning of a subnet including an addressable unit.

Turning now to FIG. 3B, illustrated is an HVAC device state machine 310 illustrated for a subnet, including the unit 155, in more detail. Solid lines indicate normal state transitions when the subnet is transitioning from one state to another state, green lines indicate a subroutine call and red lines, alternating dotted and dashed lines indicate unexpected yet valid transitions. All states other than state 326 represent device states, and the state 326 represents a message handling routine.

As is illustrated in the present embodiment, a reset state 312 of a subnet advances to a NVM CRC check 316 for a given device (such as unit 155). If the device fails the test, the device advances to a NVM programming 318. If the device passes, however, then in subnet startup 320, the device is assigned an address (Equipment Type number) and some features and parameters of the unit 155 may be shared with the subnet. Then, in substate 324, device commissioning as described in FIG. 3A occurs. This then leads to an installer test state 328. This, in turn, then leads to a link mode startup 330, as described above. Finally, then in a step 334, normal system operation occurs, although system can reset to state 312 or be brought to states 314 or 332 via diagnostic messages handled in a state 326.

In a further embodiment, during the NVM CRC check 316, the state machine 310 can advance to a NVM programming state 318. This can occur due to such factors as a failure of a non-volatile memory, or an initial programming of the NVM. In a yet further embodiment, each of these units 155 is programmed to deal with one form of a diagnostic message regarding system errors in a state 326, and from there to testing the device 160 itself in an OEM test mode 332.

Turning now to FIG. 3C, illustrated is a state flow diagram 340 for the active subnet controller 230 in relation to the unit 155. Generally, is the responsibility of the active subnet controller 230a to implement proper state transitions. The other units 155 follow the explicit direction of the aSC 230a for all valid transactions. These state diagrams are included to help ensure that a state of the unit 155 is the same as the subnet controller. The SC 230a is responsible for device synchronization. If the unit 155 is detected out of synch with the rest of the system, the aSC 230a, in some embodiments, immediately tries to bring the unit 155 to the current system state, if possible.

If an addressable unit 155 is detected in subnet startup 342, the subnet controller 230a applies asynchronous startup rules, which generally pertain to how many parameters are to be passed between device 290 of the addressable unit 155 and the active subnet controller 230a.

If an addressable unit 155 is detected in commissioning 345, installer test 346, link mode 347 or normal operation 348 substates, the unit 155, in some embodiments, is brought to the current state via a resend of an "aSC Change State" message, which involves transitioning from a first current aSC state to a second current aSC state.

In some embodiments, if a unit 155 is detected in OEM Test or Soft Disabled state, the unit 155 shall be reset by the active subnet controller 230a in a step 342. If a unit 155 is detected in "Hard Disabled" or "NVM Programming" state, the active subnet controller 230a assumes that it is not available on the subnet.

In a further embodiment, inactive subnet controllers 230i are required to keep the most up to date subnet and HVAC system configuration information. Inactive subnet controllers 230i listen to all UI/G and aSC messages and continuously update their non-volatile memory to be attempt to be as consistent as possible with the settings stored in active subnet controller 230a.

Various Aspects of System Recovery in an HVAC Network

Figure 3D:
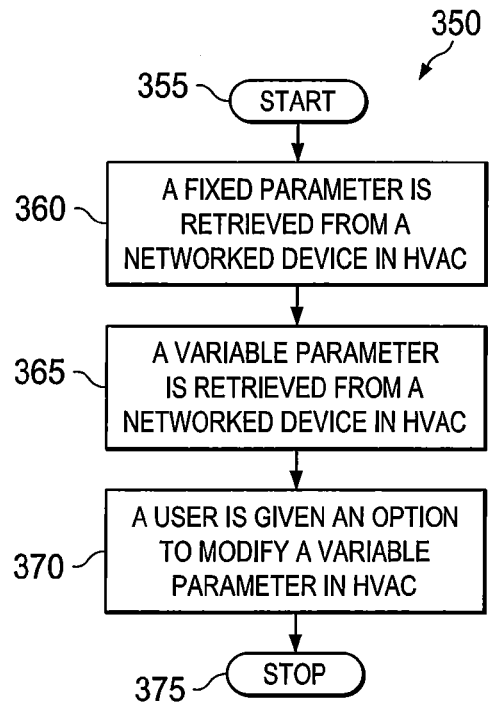
FIG. 3D illustrates an exemplary flow diagram of a method that allows a user to modify a parameter that is conveyed from a device coupled to a subnet to a subnet controller.

Turning now to FIG. 3D, illustrated is an exemplary flow of a method 350 that allows for a user to modify parameters of various networked units 155 (henceforth also to be referred to interchangeably as "devices"), in the HVAC network 200 of the HVAC system 100. This method 350 can occur, for example in the commissioning state 324 of the flow 310.

After a start step 355, in a step 360, a fixed parameter is conveyed from a first networked device to a first subnet controller, such as to the active subnet controller 230a. In a step 365, a variable parameter is retrieved from the first networked devices to a subnet controller, such as to the active subnet controller 230a. In a step 370, a user is given an option to modify a variable parameter. The user can also be an installer. In a further embodiment, the modification occurs through employment of the user interface 240 or gateway 250. In this case, the aSC 230a relays the current parameter values retrieved during steps 360 and 365 to the user interface 240 or gateway 250. The user interface 240 or gateway 250 have the option to interrogate the device for additional parameter information, such as its definition, limits, default value, text strings associated with it, etc. In a yet further embodiment, the active subnet controller 230 has these modified values stored within itself, and then conveys copies of these modified values back to the units 155.

In a still further embodiment, all variable parameters from all networked devices in a HVAC subnet, correlated to the subnet controller, are also stored in the subnet controller. In a yet further embodiment, copies of the fixed and variable parameters are also stored in a second subnet controller, wherein: a first subnet controller is active, and the second subnet controller is inactive.

Figure 3E:
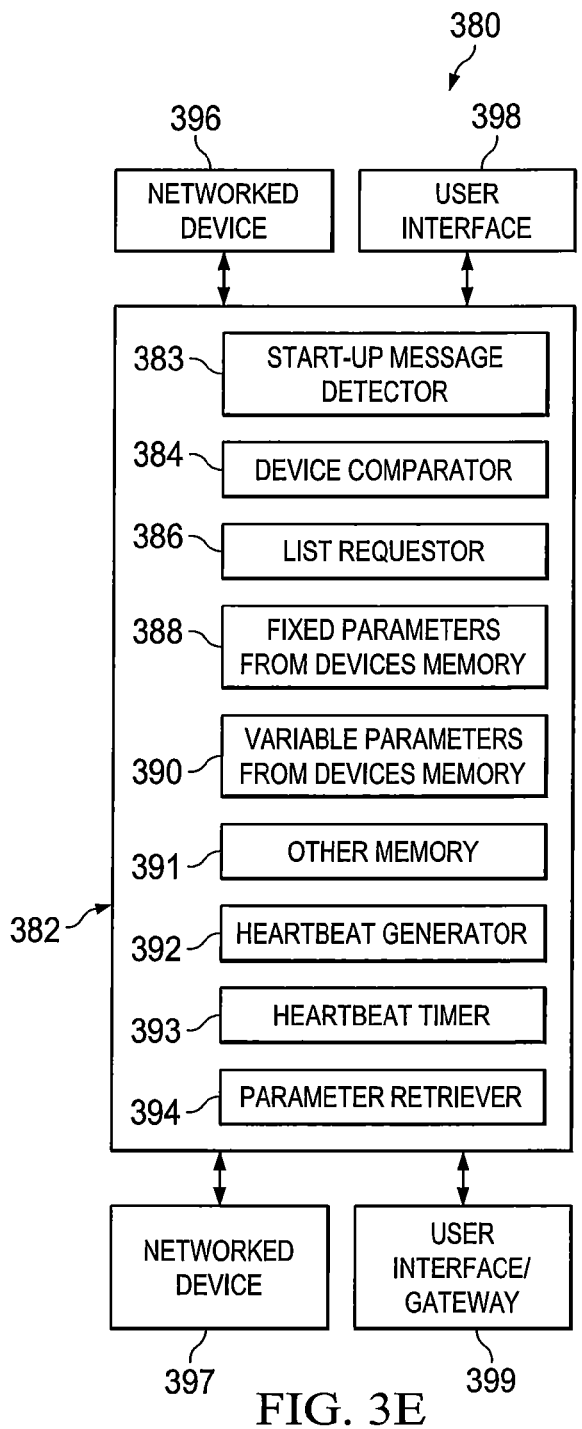
FIG. 3E illustrates a high-level diagram of an embodiment for storing parameters and for generating a heartbeat in a subnet of an HVAC system.

Turning now to FIG. 3E, illustrated is a high-level block diagram of one embodiment of a subnet 380 including a subnet controller 382 and coupled networked devices 396, 397, a user interface 398, and a gateway 399 for use in the HVAC system 100. The controller 382 has a start-up message detector 383, a device comparator 384, a list requestor 386, a fixed parameters from devices memory 388, a variable parameters from devices memory 390, an other memory 391, a heartbeat generator 392, a heartbeat timer 393, and a parameter retriever 394.

In FIG. 3E, parameters to be stored within the fixed parameters from devices memory 388 and the variable parameters from devices memory 390 are conveyed between the networked devices 396, 397, and the interface 398 and gateway 399, such as described in method 350, above. Other components of the subnet controller 382, mentioned above, will be described in greater detail below.

Figure 4A:
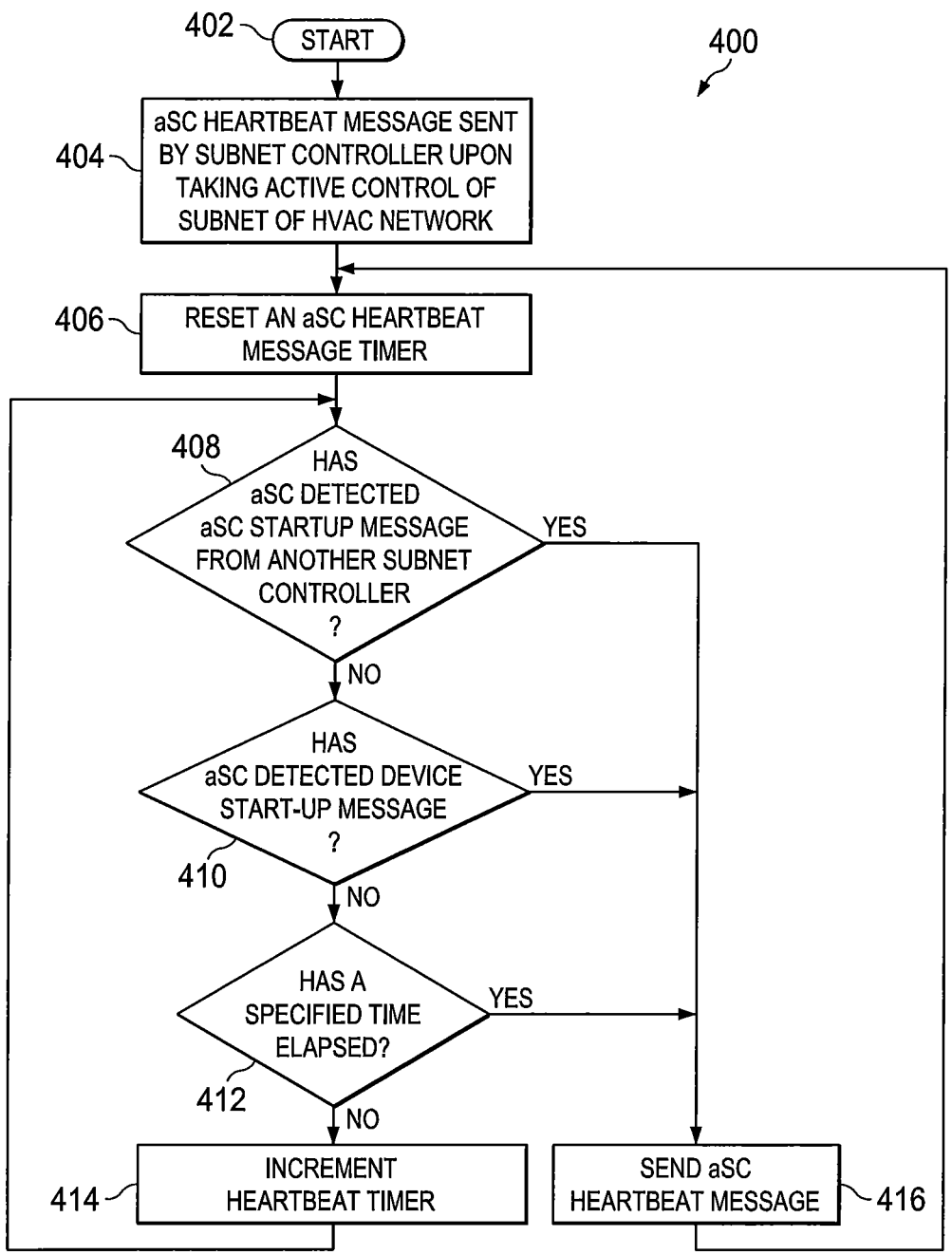
FIG. 4A illustrates an exemplary flow diagram of a method for generating an active heartbeat message by an active subnet controller of an HVAC network.

Turning now to FIG. 4A, illustrated is an exemplary flow for a method 400 for a generation of a heartbeat message by an active subnet controller, such as the active subnet controller 230a. Generally, the active subnet controller 230a generates an "aSC Heartbeat" message, such as is illustrated in the method 400, which can be used to identify and re-identify the active subnet controller 230a for a given network subnet, and indicates to various units 155 on that subnet that at least some subnet communication is occurring. This can occur, for example, in the normal system operation state 334 of the flow 310 of FIG. 3B.

The "aSC Heartbeat" message can be sent out by the active subnet controller 230a immediately after it takes control of a subnet, and is also sent out after periodically after a given period of time has elapsed, such as once a minute, as well as immediately after seeing any "SC Startup" or "Device Startup" messages on its own subnet. An "SC Startup" message can be generally regarded as a message sent by a subnet controller when it initiates its own subnet controller startup, such as discussed regarded the subnet controller startup state machine 460, to be discussed regarding FIG. 4E, below. The one-minute elapsed time period is counted from the previous heartbeat message send time.

In one embodiment, if the active subnet controller 230a does not provide its "aSC Heartbeat" message after more than a selected period of time has elapsed, perhaps three minutes, any other existing inactive subnet controller 230i on the same subnet restarts and causes the subnet to go to a "Subnet Startup" state, such as illustrated in the subnet controller startup state machine 460, below, and also issue the "SC Startup" message. In a further embodiment, if the unit 155 does not see an "aSC Heartbeat" message for more than three minutes, it issues an "aSC Missing" alarm to indicate the active subnet controller 230 is missing and ceases any equipment operation, but keeps sending its "Device Status" messages.

In the method 400, after a start step 402, in a step 404, an "aSC heartbeat" message is sent by the heartbeat generator 392 of the subnet controller 380, which is an active subnet controller 230a upon taking active control of a subnet of the HVAC system 100. In a step 406, the active subnet controller 230a resets the heartbeat timer 393 of the subnet controller 380.

In a step 408, it is determined whether the start-up message detector 383 has detected a startup message from another active subnet controller 230a. If yes, the flow increments to a step 416. If no, the flow increments to a step 410.

In the step 410, it is determined whether the start-up message detector 383 has detected a startup message from a unit 155. If yes, the flow increments to a step 416. If no, the flow increments to a step 412.

In the step 412, it is determined, such as by the heartbeat timer 393, whether a specified time has elapsed since a last heartbeat. If the specified time has elapsed, then the method advances to step 416. If the specified time has not elapsed, the method advances to step 414.

In step 414, the heartbeat timer 393 is incremented, and the method 400 begins again with the step 408. In step 416, the heartbeat generator 392 generates an active subnet controller heartbeat pulse, and advances to the step 406, upon which the heartbeat timer 393 is reset, and the method 400 again advances to the step 408.

Figure 4B:
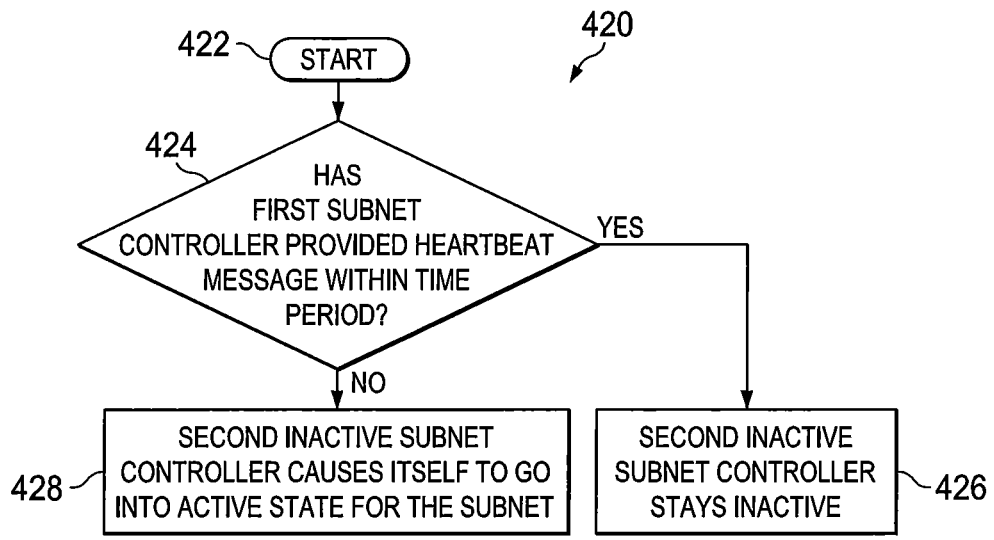
FIG. 4B illustrates an exemplary flow diagram of a method for monitoring for a presence or an absence of an active heartbeat message by an inactive subnet controller in an HVAC network.

Turning now to FIG. 4B, illustrated is a method 420 that illustrates an exemplary behavior of an inactive subnet controller 230i regarding heartbeat messages that can also occur within state 334 of the flow 310. After a start step 422, a second, inactive, subnet controller 230i determines whether a first, purportedly active, subnet controller of a subnet has provided a heartbeat message within a selected length of time, such as within three minutes. If the active heartbeat has been provided, the method 420 advances to step 426, and the second, inactive, subnet controller 230i stays inactive. However, if the second inactive subnet controller 230i has not detected a heartbeat message within the selected length of time, the second inactive subnet controller 230i transitions into an active subnet startup state, with itself possibly becoming the active subnet controller.

Figure 4C:
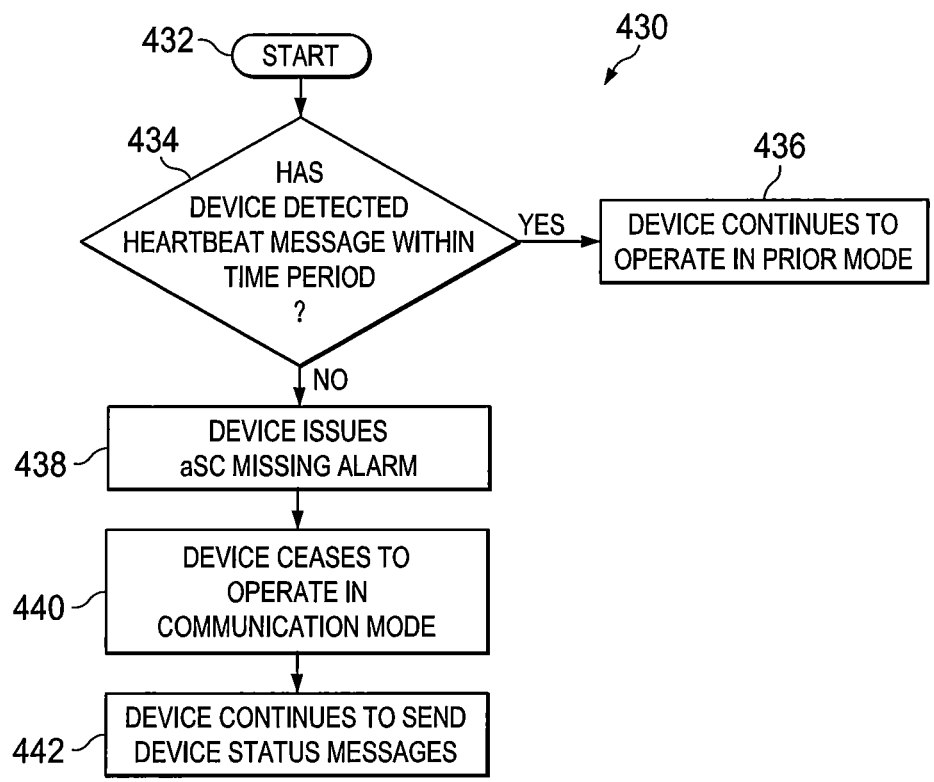
FIG. 4C illustrates an exemplary flow diagram of a method for monitoring for a presence or an absence of an active heartbeat message by a device coupled to a subnet of an HVAC network.

Turning now to FIG. 4C, illustrated is an exemplary method 430 that illustrates behavior of a coupled unit 155 regarding heartbeat messages that can also occur within state 334 of the flow 310. After a start step 432, the unit 155 determines whether a subnet controller 230, a purported active controller, has provided a heartbeat message within a specified time period, such as within one minute. If the subnet controller 230 has provided such a heartbeat message, the flow 430 advances to a step 436, and the coupled unit 155 continues to act in its prior mode. However, if the unit 155 has not detected a heartbeat message within the selected length of time, the unit 155 advances to a step 438, and issues an "aSC heartbeat missing" alarm. In a step 440, the devices ceases to operate in a communication/normal operation mode, and in a step 442, the unit 155 continues to send devices status messages.

Figure 4D:
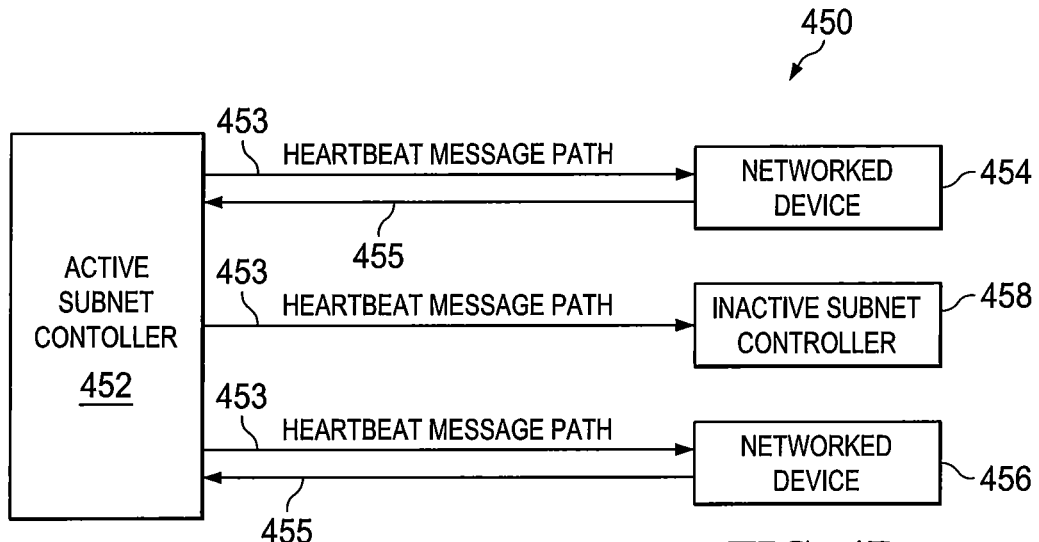
FIG. 4D illustrates one embodiment of a high-level block diagram of an active subnet controller coupled to an inactive subnet controller and devices in an HVAC network.

Turning briefly to FIG. 4D, illustrated is an embodiment of a high-level system diagram for a subnet 450 with multiple subnet controllers 452, 458 for conveying heartbeat messages, devices statuses, and so on. In the subnet 450, the active subnet controller 452 is coupled by a heartbeat message path 453 to the inactive subnet controller 458 in the HVAC system 100. A first networked device 454 and a second networked device 456 are both coupled via pathways 455 to the active subnet controller 452. These pathways 455 can carry alarm messages, device status messages, and so on.

Figure 4E:
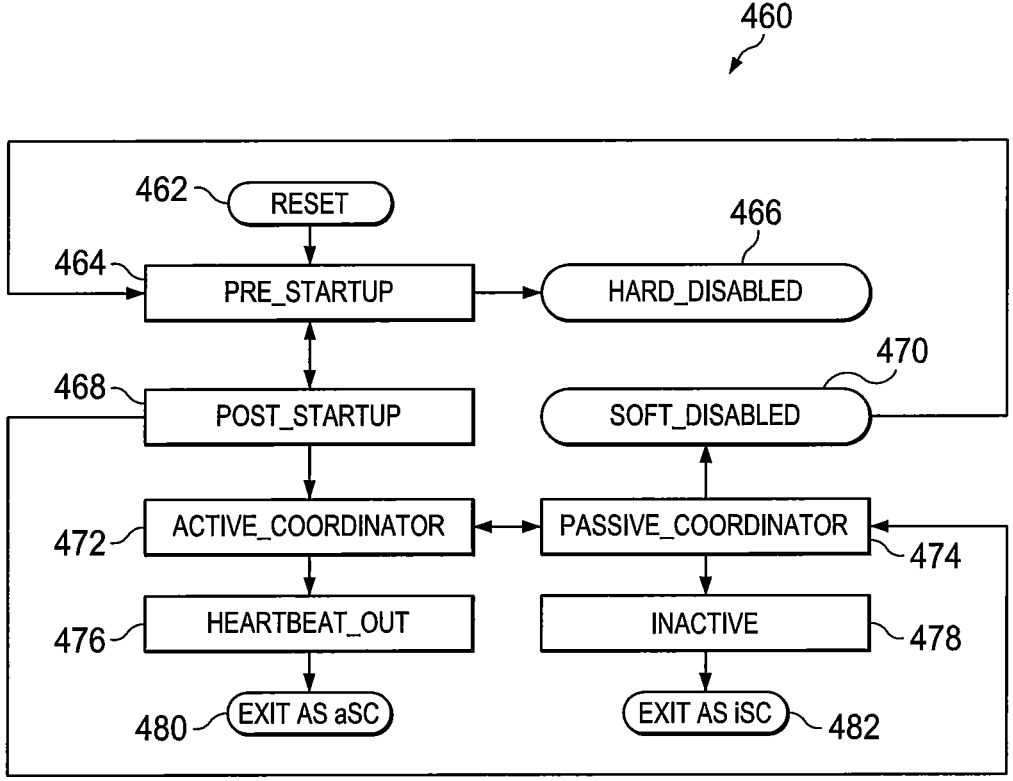
FIG. 4E illustrates an exemplary state machine of a startup to activate a subnet controller of a subnet of an HVAC network.

Turning now to FIG. 4E, illustrated is an exemplary subnet controller state machine 460 that transitions through subnet startup states. Generally, during the initial startup routines (i.e., states 462-472), the subnet controllers 230 do not queue inbound or outbound messages. The message times, discussed below, depend on this. If a message is to be sent out at exactly one specified time, it means that only one attempt should be made to send it, without an automatic retry, until a new specified time allotted allows for it.

After a reset state 462, in a state 464, the "pre startup" state, the subnet controller startup sequence 460 begins with the subnet controller 230 issuing its own "Subnet Controller Startup" message. This can happen, in one embodiment, after a time lapse of 3000 milliseconds after entering the sequence 460, plus a Device Designator ("DD") derived delay time (following a norm for startup messages), of the subnet controller 230 after coming out of reset. DD can be a unique 32-bit number that represents a media access control (MAC) layer address of the unit 155.

In a state 464, immediately upon "power up" and completion of a "NVM Check," each subnet controller 230 then starts to monitor its own subnet on the bus 180 for startup messages from other units 155 and other subnet controllers 230. Generally, the subnet controller 230, after start-up, keeps track of all DDs, equipment types, and serial numbers for all units 155 that send their startup messages on the subnet. The subnet controller 230 can be hard-disabled 466 due to significant diagnostic messages.

During subnet controller "pre_startup" in the state 464, in one embodiment, each subnet controller 230 attempts to send out at least two messages: first, 3000 milliseconds after coming out of the reset 462, the subnet controller 230 sends out a "Subnet Controller Startup" message. Then, in a post startup state 468, 1000 milliseconds after sending the first message, the subnet controller 230 attempts to send a "SC Coordinator" message. This means that, even in the most favorable case with no other traffic on the network, the "SC Coordinator" message actually starts appearing on the bus 180 at 1000 ms plus the time used to send the "SC Startup" message on the bus 180.

If the subnet controller 230 succeeds in sending out the "SC Coordinator" message, it becomes the active coordinator and proceeds to coordinate the system configuration for its subnet in an active coordinator state 472. If it fails or sees another subnet controller become or already existing as an active coordinator, it goes into a "passive_coordinator" state 474 and becomes a passive coordinator. A "passive_coordinator" state involves the "passive coordinator" not sending out any messages on the network, except for when directly queried by the active coordinator.

From the "passive_coordinator" state 474, the subnet controller 230 can transition to an "inactive" state 478, and exits as an inactive controller 482. Alternatively, the passive coordinator subnet controller 230 can transition into a soft-disabled state 466, and from there back into the "pre_startup" state 464.

In the "active_coordinator" state 472, the subnet controller 230 can ensure that it is the most qualified subnet controller 230 by querying all other subnet controllers 230 on the subnet. Qualified can be evaluated by such factors as having a most recent software updates, the fastest reaction time, being especially designated as being a most qualified subnet by an installer, for example.

If it is the most qualified SC 230 on the subnet, it can proceed to take over the control of the subnet by issuing, first, an "SC Ready To Take Over" message and then, 1000 milliseconds later the "aSC Heartbeat" message in a state 476, such as discussed in step 404 of flow 400. Otherwise, the subnet controller 230, employing the state machine 460, will pass a token to the most qualified subnet controller, and instead become a passive coordinator in state 474. A successful generation of the heartbeat message means that the subnet controller 230 has become an active subnet controller 230a and has taken control of its subnet.

In one embodiment, even in a most favorable case with no other traffic on the network, the "aSC Heartbeat" message actually starts appearing on the bus 180 first at 1000 milliseconds after transitioning to state 476 plus the time interval needed to send the "SC Ready to Take Over" message on the bus 180. At that time, the active subnet controller 230 determines if the subnet is in "configuration" or in "verification" mode and proceeds to program the subnet and its various components accordingly.

In one embodiment, if the subnet is in "verification" mode, the active subnet controller 230a issues alarms for all missing and new units 155. New units 155 will be excluded from the subnet and placed in the soft-disabled state 470. It is also at this time that the active subnet controller 230 checks a validity of the subnet's configuration and issues appropriate alarms if needed. If the subnet is configured correctly, the active subnet controller 230 concludes the subnet startup by issuing the "aSC Change State" message, to start the commissioning state diagram 300 for the unit or units 155, and then exits the state diagram 460, as an active subnet controller 230.

Figure 5A:
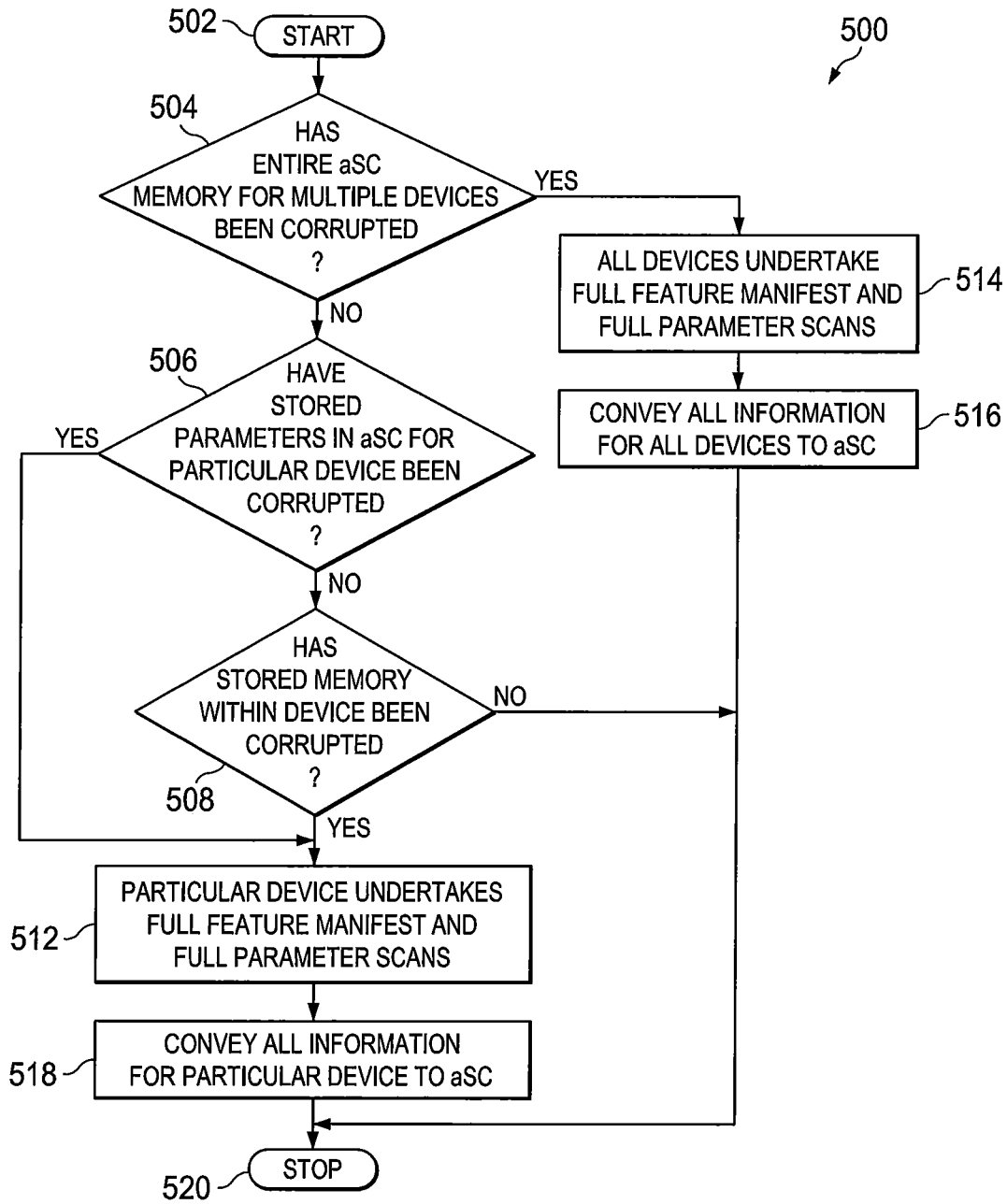
FIG. 5A illustrates an exemplary flow diagram of a method of a request for information by an active subnet controller upon a determination of a memory error in an HVAC network.
Figure 5B:
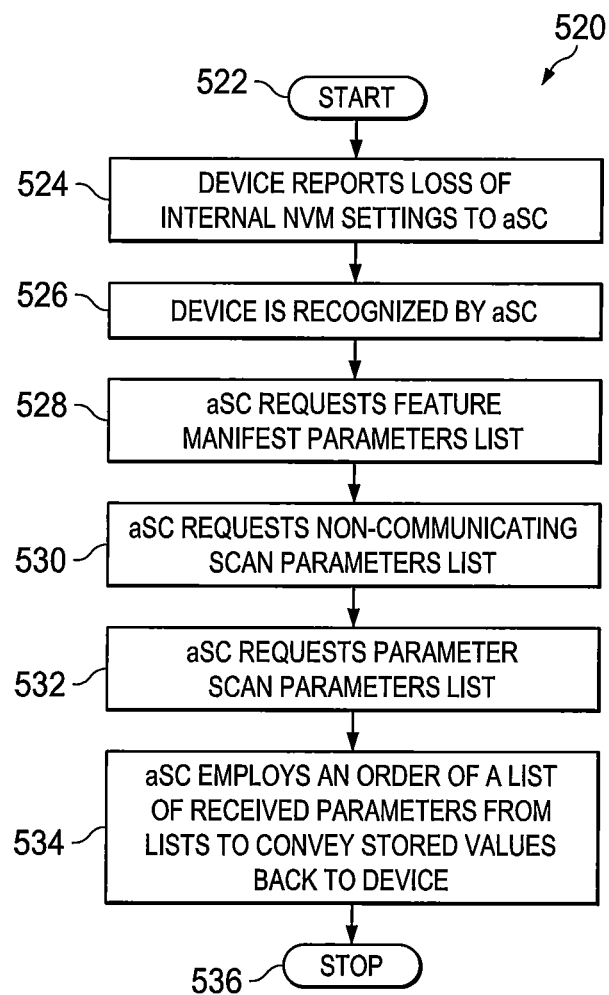
FIG. 5B illustrates an exemplary flow diagram of a method of a request by an active subnet controller for information from a coupled network device after a memory failure.

Turning now generally to FIGS. 5A-5B, generally are illustrated exemplary flow diagrams of methods 500, 520, respectively, that are generally directed to corrupted memory handling in a subnet or subnet controller of the HVAC 100 system. The method 500 is directed towards determining whether the active subnet controller 230a contains a valid, previously backed-up version of the unit's 155 data, and the method 520 is directed towards a particular series of steps in a transfer of data between the active subnet controller 230 and the unit 155.

In one embodiment, the methods 500, 520 can be generally designed to check integrity of software in a flash memory, and to check integrity of data in an Electrically Erasable Programmable Read-Only Memory ("EEPROM"), Magnetoresistive Random Access Memory ("MRAM"), or equivalent, for both the units 155 and the subnet controllers 230. Generally, all units 155 have rewritable non-volatile memory to support various protocols. All protocol-related device settings stored in its EEPROM are also backed up by all subnet controllers 230 on the subnet of the HVAC system 100 in their own internal memories. Additionally, units 155 can back-up some application specific data in the subnet controllers 230. This happens in form of special feature numbers that are part of the "Feature Manifest" in commissioning.

In a further embodiment, if the unit 155 has internal copy of its EEPROM settings to facilitate its recovery, the recovery is transparent to the unit's 155 behavior in the system 100 and it is determined that the unit 155 is able to work correctly (using the backed up correct values) before sending out its "DEVICE Startup" message.

Turning again to FIG. 5A, illustrated is an exemplary method flow 500 for restoring corrupted memory data for the unit 155. Generally, these steps 502-520 are undertaken by the active subnet controller 230a in conjunction with one or more units 155.

Four memory failure scenarios are described:

a. The unit 155 loses its data but is able to recover it from an internal backup.

b. The unit 155 is unable to retrieve the memory values on its own, and the active subnet controller 230a has stored within itself the correct values for the device, wherein the active subnet controller 230a can relay the backed-up data to the device.

c. The active subnet controller 230a has corrupted data and it recovers data from the unit 155.

d. In a further embodiment, if both the active subnet controller 230a and the unit 155 are unable to retrieve previous data, the unit 155 shall revert to the default settings, and update the active subnet controller 230a.

Generally, the method 500 employs retrieval of data between the unit 155 and the active subnet controller 230a, which can be in conjunction with the above points (a)-(d). After a start step 502, it is determined if an entire memory parameters of all the units 155 stored within a memory of the active subnet controller 230a has been corrupted in a step 504. Typically, the active subnet controller 230a keeps a separate CRC for each the unit 155.

If the entire memory for multiple devices has been corrupted, then the method 500 advances to a step 514, and all units 155 undertake a full feature manifest and full parameter scans.

In a further embodiment, in a step 514, if the units 155 are unable to retrieve their various parameters, the unit 155 shall revert to the default settings and update the active subnet controller 230a. However, if the entire memory of the active subnet controller 230a regarding the unit 155 in its subnet is not corrupted, the method 500 advances to a step 506.

In a step 506, it is determined whether stored parameters for a particular device have been corrupted in the active subnet controller 230a. If they have for a particular device, then the method 500 advances to a step 512, and the selected the unit 155 that is to have its corrupted memory corrected undertakes a full feature manifest and full parameter scans, and forwards this to the active subnet controller 230a. In one further embodiment of step 512, if the unit 155 is unable to retrieve these parameters, the unit 155 reverts to its default settings and updates the active subnet controller 230a with these default values in a step 518, and stops at a step 520.

However, if the memory of the active subnet controller 230a regarding units 155 in its subnet is not corrupted, the method 500 advances to a step 508. In step 508, it is determined whether the stored memory on the unit 155 has been corrupted. If it has, the active subnet controller 230a forces the unit 155 to perform a full feature manifest and a full parameter scan in a step 512, and then to convey this information to the active subnet controller 230 in a step 518. The method 500 steps in a step 520. The method 500 also stops in a step 520 if no memory corruption is detected.

In a further embodiment, the actions undertaken by the device and the active subnet controller 230a in the above scenarios (a)-(d) given above, are as follows, in more detail:

a. In this case, in one embodiment, the unit 155 should first try to recover the data from an internal backup in a manner invisible to other units 155 of the same subnet of the HVAC network 200 of the HVAC system 100. No indication of this occurrence is given. For example, if the active subnet controller 230a is in the "verification" mode, the active subnet controller 230a performs as described above—i.e., there is no need to perform full "Feature Manifest," "Non-Communicating Check" and "Parameter Scan" in Commissioning, as this occurs only during the "configuration" mode.

b. In this case, in one embodiment, the unit 155 starts with its "Device Startup" message sent on a Subnet 0 channel, using a "default" equipment type, with a CF6 flag cleared. For the unit 155, "CF6=0" if the Data CRC check performed by the device 110 has failed. Therefore, all data within the device 110 is invalidated and are returned to default values by the active subnet controller 230a. Generally, when set to "0," this flag is set back to "1" when all data values are fully recovered from either the internal default values or over the bus 180 from the active subnet controller 230a, but only after the unit 155 has successfully completed commissioning.

For b., the unit 155 responds to all "SC Coordinator" messages using the same message, the "Device Startup" message, until a new equipment type and Subnet ID are assigned to the unit 155. As long as the NVM data is not recovered, the CF6 flag remains reset. Once an active subnet controller 230a takes over due to this error condition, the active subnet controller 230a proceeds to assign the equipment type to and Subnet ID to the unit 155, which the device 230 stores internally. The active subnet controller 230a recognizes the unit 155 using its Device Designator, and assigns the same equipment type and subnet ID to the unit 155 as it had before.

Furthermore in b., immediately after recognizing that it cannot retrieve its NVM data, the unit 155 starts to recover all of its lost data to their default values stored in its device flash. The active subnet controller 230a, upon entering commissioning 300, reprograms the device 110 with the data from its backup. If so attempted, the unit/device has to accept the active subnet controller 230a data in place of its default values.

For c., in one embodiment, this scenario only matters in "verification" mode, as in "configuration" mode the active subnet controller 230 updates its internal backup data from all units 155 anyway. Thus, in "verification," the active subnet controller 230 forces full "Feature Manifest, Non-Communicating Check Scan and Parameter Scan" on the particular units 155 that it lost data from, in place of the abbreviated version that normally happens during Verification.

For d., in this case, in one embodiment, the unit 155 retrieves its default values, and when in "verification," the active subnet controller 230 shall proceed with the full "Feature Manifest, Non-Communicating Check Scan and Parameter Scan" on the particular units 155 that it lost data from, in place of the abbreviated version that normally happens during verification mode.

Turning now to FIG. 5B, illustrated is an exemplary flow of a method 520 for both a "configuration" mode and a "verification" mode of a request of the active subnet controller 230a for information from a coupled network device of the HVAC system 100 after a memory failure. The method 520 can occur as a result of the action in the combination of states 316 and 318 of the flow 310.

After a start step 522, in a step 524, the addressable unit 155 reports loss of internal memory settings, such as NVM settings, to the active subnet controller 230a. In a step 526, the unit 155 is recognized by the active subnet controller 230a. This occurs because the active subnet controller 230a recognizes both the DD, as it matches exactly for its stored backup data for the unit 155, and a received equipment type is of a same type as an equipment type stored for that device in the active subnet controller 230a. In one embodiment, this information can be stored in the other memory 391 of the subnet controller 380.

In a step 528, the active subnet controller 230a requests a full feature parameters list from the unit 155, and in step 530, the active subnet controller 230a requests non-communicating scan parameters list and a parameters scan parameters list in a step 532. A full feature parameter list is a list of the types of feature ("fixed") parameters hardwired into the unit 155, a non-communicating scan list is a list of parameters that are employed by a communicating device to configure another device, physically attached to unit 155 (such as by the means of another communicating bus, or simple switch or power lines) that does not communicate directly with a subnet controller during commissioning, and a parameters scan parameters list is a list of variable parameters used by the unit 155.

In a step 534, the method 520 employs an order of presentation of these lists. The method 520 does not enquire about the actual values conveyed from the unit 155. Instead, the method 520 uses an order of these parameters to index information and then to send information that was previously stored in the active subnet controller 230a back to the unit 155, as determined by the received order. The order transmitted can be the exact order as received. The method 520 ends on a stop step 536.

In a further embodiment of the method 520, the fixed parameters listed in step 528 are provided to the device immediately, before step 530 is executed. In yet further embodiment of the same method, the non-communicating parameters listed in step 530 are provided to the device immediately, before step 532 is executed.

Figure 6A:
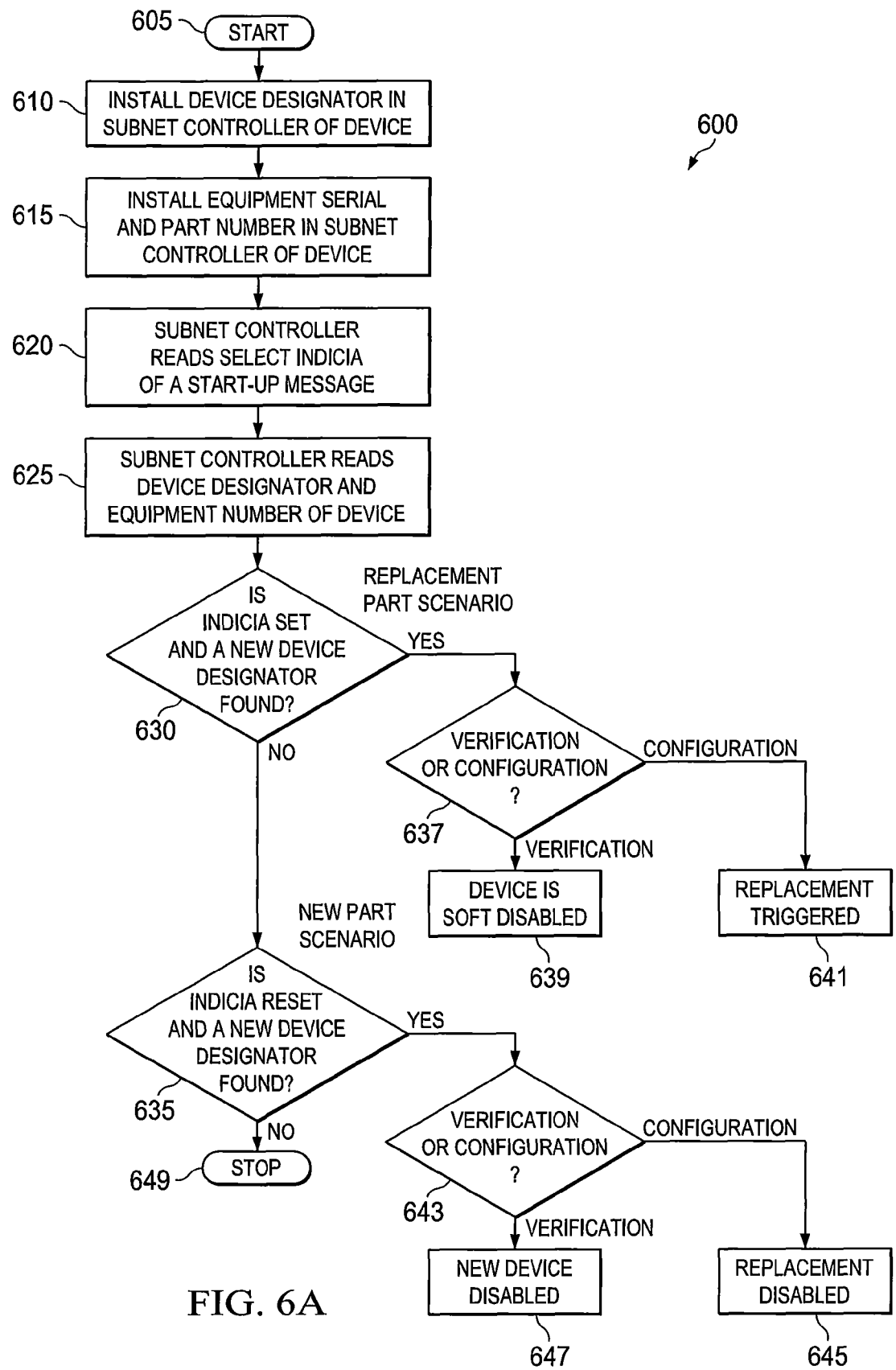
FIG. 6A illustrates an exemplary flow method of a replacement part configuration in a communicating HVAC network.

Turning now to FIG. 6A, illustrated is an exemplary method flow 600 for configuration of replacement parts in a communicating HVAC network 200. A goal of this flow is to automatically commission replacement devices in a customer home. Generally, control settings are restored from a backup copy existing in a master controller, such as an active subnet controller 230a. This can be advantageous, in that an installer does not have to manually configure a part, and factory default calibration values are preserved as well. The method 600 can occur in combination with state 324 of flow 310 or 332 of flow 310.

In method 600, after a start step 605, a DD is installed into a subnet controller of a device, such as unit 155. In a state 615, an equipment serial number and part number are installed in a subnet controller of the device. In a state 620, the subnet controller reads a select indicia of a start-up message of a device/unit, which may or not be the same device of whose the DD and part numbers where stored in steps 610 and 615. In a step 625, the subnet controller reads the DD and equipment number of the device. In step 630, it is determined whether the indicia is set (e.g., it equals "1"), and a new device designator is found.

If this is true, then this is indicative of a replacement part scenario, and the method then advances to a step 637, wherein it is determined if the device is in verification or configuration mode. If it is in verification mode, the device is soft-disabled in a step 639. If it is in configuration mode, then a replacement scenario is triggered in a step 641.

However, if step 630 is not true, the method 600 advances to a step 635. In step 635, it is determined whether an indicia is reset that is received from the device, and whether a new device designator is found. If this condition is true, then a new device scenario occurs. Then in step 643 it is determined whether the system is in verification mode or configuration mode. If configuration, then in step 645, a replacement mode is disabled, as this device that has been added is a new device. If in verification, the new device itself is disabled in a state 647. Otherwise, the method stops in a step 649.

In one embodiment of the method 600, when in configuration mode and the aSC 230a determines that a device is missing and that a physically different, yet compatible device/unit was put into the subnet with a CF5 flag set, it prompts the user, via the active UI/G 250 to decide whether the new device should have the parameters of the missing device copied into it. If affirmed by the user, the aSC 230a proceeds to also store in it, the relevant equipment-related features such as Equipment Serial Number, Equipment Part Number and its capacity as well as previously set Parameter values.

In one embodiment, the ASC 230a checks the device compatibility by requesting the "Compatible Devices List" feature of the unit 155 and checking the part numbers contained within it against the "Control Part Number" of the missing device. If there are any problems with programming any specific features or parameters, the subnet controller 230a shall prompt the user and still attempt to program the remaining information.

Each subnet controller 230, both active and inactive, can store the DD and equipment serial and part number for a given unit 155. DDs are programmed at a supplier's plant, and the Equipment and Part numbers are programmed an installer's plant. Replacement control memories have supplier-programmed device designators, but have blank values for equipment and serial and part numbers. This fact, together with the bit CF5 from the DEVICE startup message, as will be discussed below, lets them be distinguished in the system when they are installed, and facilitates automatic configuration of these controls from backed-up information stored in the active subnet controller 230a.

Generally, the aSC 230a categorizes the control based on its DD as compared to the DD stored in the aSCs 230a backup memory, and also based on the value of the CF5 flag, to be discussed below. When the CF5 flag is set, the new DD value and the lack of corresponding device, such as unit 155, on the subnet (device is missing) is indicative of a replacement part scenario. When in verification, the new device is soft disabled. When in configuration, the replacement part mechanism is triggered during commissioning.

When the CF5 flag is zero and the DD does not match, new equipment has been added to the subnet and it should not be reprogrammed, hence no replacement scenario is triggered in commissioning. In "Verification," the new device is disabled. To summarize, the only scenario when the as 230a triggers the "Replacement Part Check in Commissioning" is when an old device is missing, and a new device with the same equipment type is introduced on the subnet and has its CF5 flag set. Consequently, each replacement part check is accompanied by the Missing Device2 alarm triggered by the aSC 230a to inform the user that the old device is missing.

During the replacement part check in commissioning, the ASC 230a can verify that the new device 290 is compatible with the missing one and prompts the user to automatically configure the control by listing two sets of serial and part numbers—one from the old device 290 originally installed in the unit 155 and the other one from the replacement device 290 that was just introduced to the subnet. The user is asked if s/he wants to copy the back up setting from the old control into the new one. If the copy is requested, the configuration data backed up in the ASC is copied into the control. This includes the equipment serial part and number. If the copy option is declined, the user configures the system manually.

Figures 1, 6B:
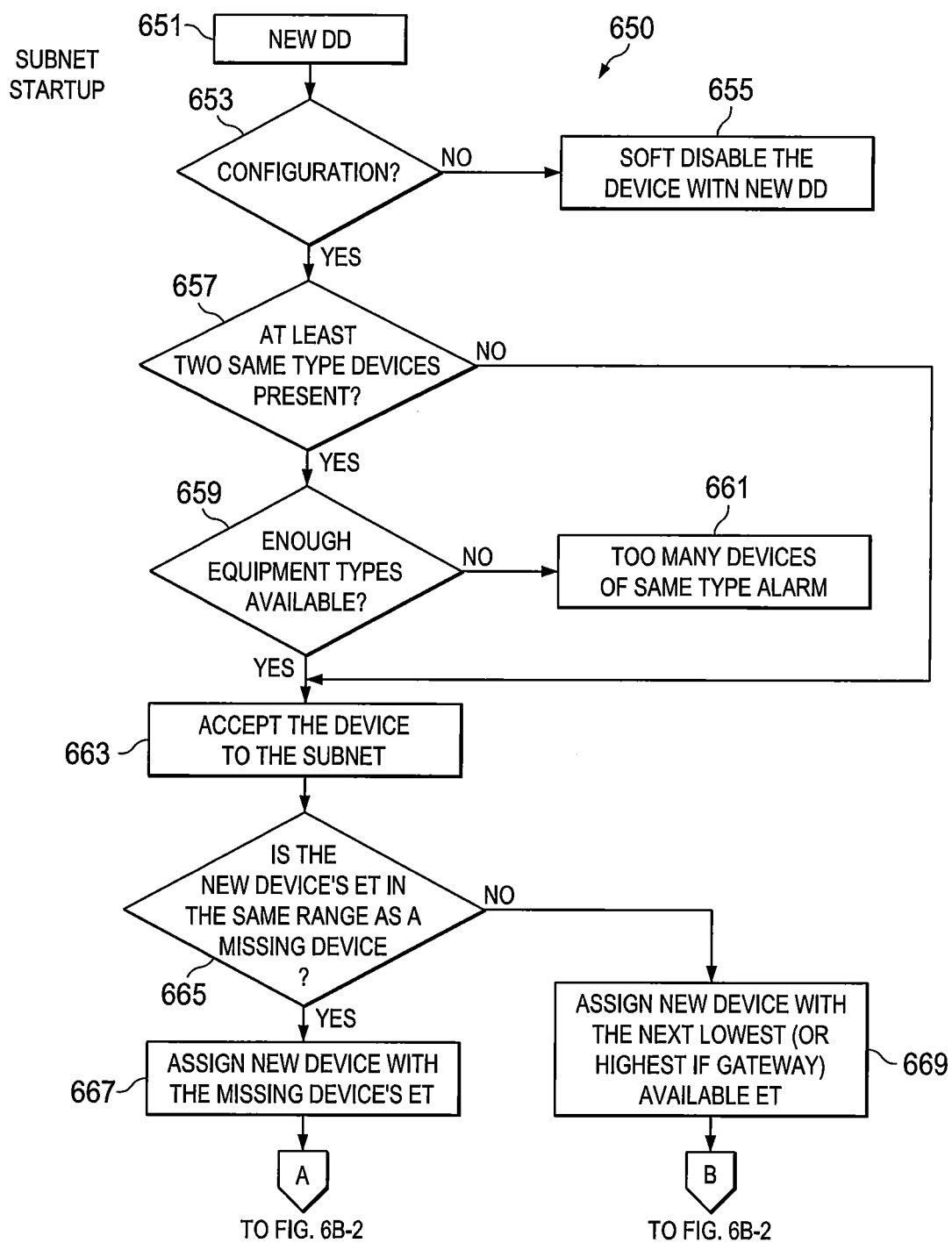
FIG. 6B illustrates an exemplary flow of active subnet controller behavior for identifying a replacement device and also for commissioning the replacement unit.
Figures 2, 6B:
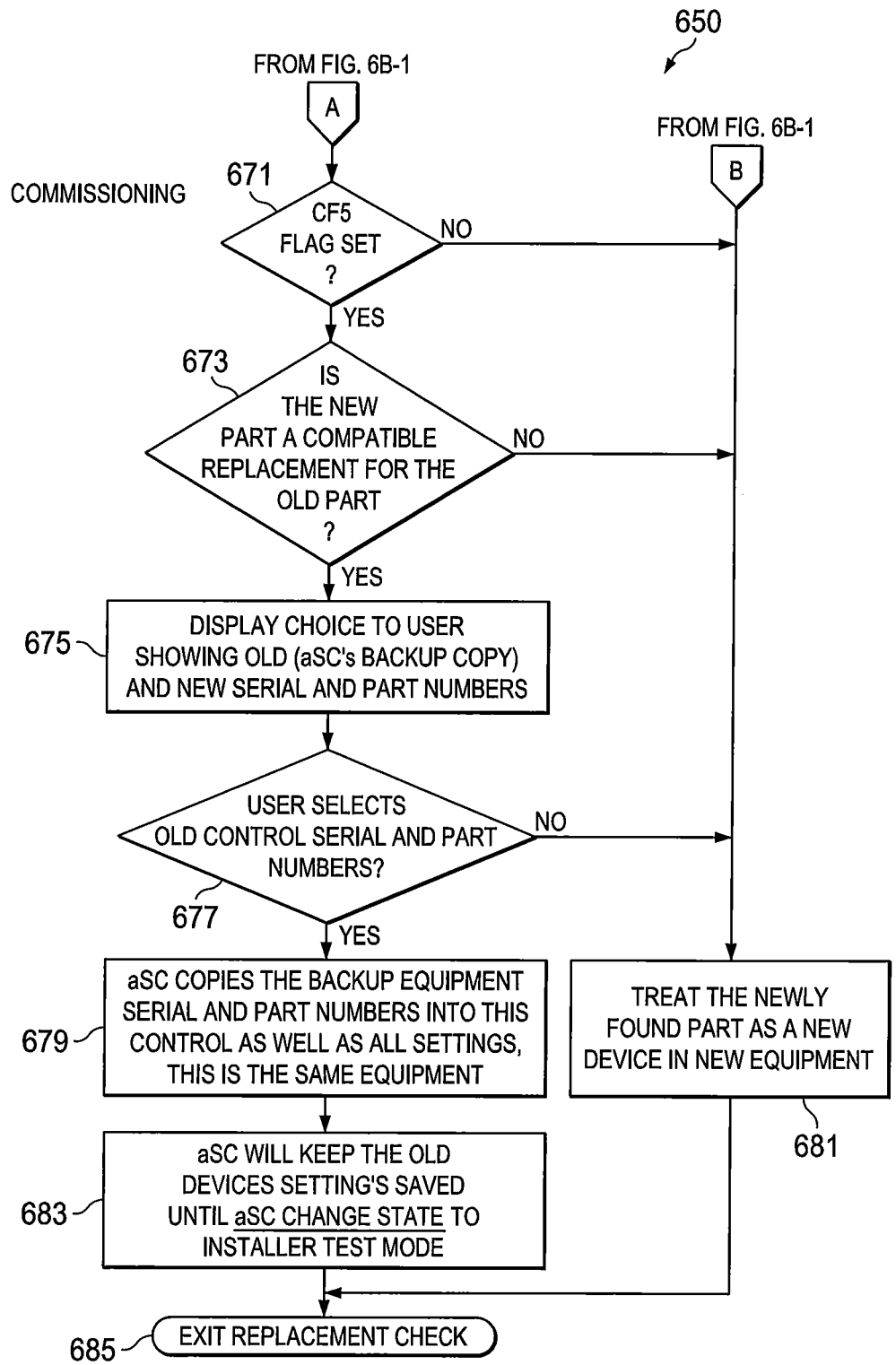

Turning now to FIG. 6B, illustrated is an exemplary flow 650 of active subnet controller 230a behavior for identifying a replacement device 290 and also for re-commissioning the unit 155. This flow 650 can be used in conjunction with method 600 of FIG. 6A.

In a step 651, the active subnet controller receives a new DD. In a step 653, the active subnet controller 230a determines whether the system is entering a configuration state. If no, a step 655 is entered, and the new device 290 is soft-disabled, and the flow ends.

However, if the system is entering into a configuration state, it is then determined by the active subnet controller 230a if there are at least two of the same type units 155 present. This is done by comparing the equipment types of their controls 290. If not, the flow 650 advances to a step 663. However, if two devices are present, the flow 650 advances to a step 659. In a step 659, it is determined if enough equipment types are available. In other words, it is determined whether the active subnet controller 230a can support this many types of devices. If not, the flow advances to step 661, and a too many devices of same type alarm is set off, and the flow ends. However, if a plurality of units 155 can be supported, then in step 663, the devices are accepted into the subnet.

Next, in step 665, it is determined whether a HVAC devices equipment type is in a same range as a missing device. If it is, then in a step 667, the new unit 155 is assigned with the missing devices equipment type, and the flow advances to a step 671. However, if not in the same range, then the new device is assigned with the next lowest (or highest if the device is a gateway) equipment type number, and advances to a step 669, and then advances to a state 681.

In steps 671-685, the commissioning stage of the unit 155 can occur. In step 671, it is determined whether the CF5 flag of the unit 155 is set. When the CF5 flag is zero, and the DD does not match, this means that new equipment is added to the subnet and it should not be reprogrammed, hence no replacement scenario is triggered in "commissioning." If the "CF5" flag is not set, the flow advances again to step 681, otherwise the flow advances into a step 673.

In step 673, it is determined whether the new part is a compatible replacement for the old part. If not, the flow 650 again advances to step 681. If yes, the flow 650 advances to a step 675. In step 675, a choice is displayed to a user, that shows the both the active subnet controller 230a old back-up copy and the new device's 290 control serial and part numbers. In a step 677, it is determined whether the user selects the old control serial and part numbers from the old back-up copy provided by the active subnet controllers 230, or the new numbers. If the user does not employ the old values provided by the active subnet controller 230a, the flow 650 advances to step 681. If yes, the flow advances to step 679. In step 681, the newly found parts 290, residing in unit 155 or units 155, are treated as a new device or new devices.

However, in a step 679, the active subnet controller 230a copies the back-up equipment serial and part numbers into the device 290, as well as other pertinent information. In a step 683, the active subnet controller 230a keeps the old unit 155 settings until an active subnet controller 230a "Change State" is invoked into an "Installer Test" mode. Both step 681 and 683 advance to step 685, wherein the replacement check ends.

Figure 7A:
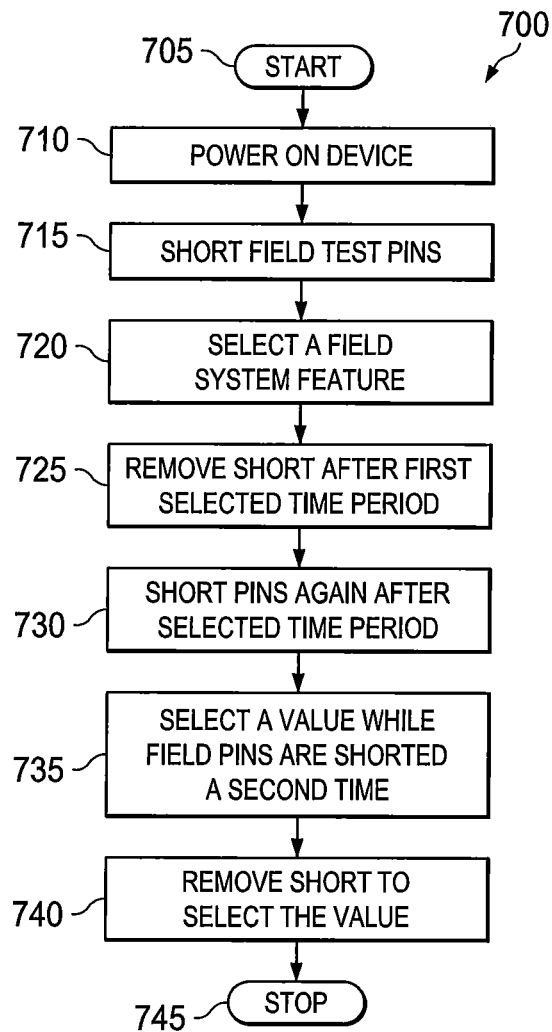
FIG. 7A illustrates an exemplary flow of a configuration of a field device that employs field pins in an HVAC network.
Figure 7B:
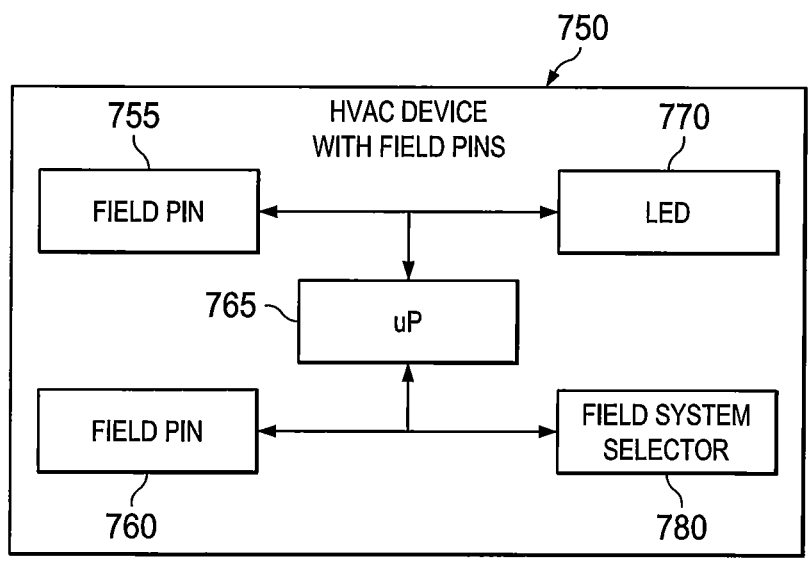
FIG. 7B illustrates a high-level block diagram of an exemplary device for use in an HVAC system that employs field pins.

Turning to FIG. 7A, illustrated is an exemplary flow of a method 700, which can be viewed and employed in conjunction with FIG. 7B which illustrates a high-level block diagram of device 750 with field pins 755, 760. In the method 700, after a start step 705, power on is applied. In one embodiment, the pins 765, 760 are already shorted upon start-up in a step 715; in another embodiment, the pins 765, 760 are shorted after start-up in a step 715. Indicia of this short can be conveyed to the microprocessor 765 of device 750. In a step 720, a dependent field system feature can be selected. For example, a dependent field feature can be, a "unit capacity" or "unit model number." This selection can be obtained through employment of a field system selector 780 of the device 750, although other approaches, such as through employment of other field pins, can also be employed. This selection can also be conveyed to the microprocessor 765.

In a step 725, the short, such as a jumper interposed between the field pins 755 and 760, is removed after a passage of first period of time, such as 5-10 seconds. In a step 730, the short is again introduced after a second time period of no shorting occurring, such as a "no shorting" time lapse of 1-3 seconds. Then, after the step 730, which re-shorts the field pins 755, 760, a light emitting diode ("LED") 770 outputs various values to be selected correlated to a field system feature in a step 735 while the field pins are shorted for a second time. In a step 740, a user removes a short, such between the field pins 755 and 760, and that value can be selected and is used to program the device 750.

For example, in one embodiment, in heat pump control, a dependent feature can be programmed by using a plurality of field pins. In a heat pump control device, in the step 715, the power is turned on with field pins shorted. In the step 720, unit capacity is chosen. In a step 730, the LED 770 will start blinking the "unit" capacity code, followed by blinks which allow for a selection of 1-6 tons of unit capacity value, with the interval of 3 seconds between weight selections. For example, there is a long blink for three seconds, (1 ton per duration of blink), and a short blink to indicate half a ton, with 0.5 second intervals between the blinks. For example, 2.5 ton is indicated by 2 long blinks and 1 short blink.

In the above example, in step 740, when the desired capacity value is displayed on the LED 770, a shorting jumper is removed from the field pins 755, 760. In one embodiment, the microprocessor 765 will continue to display the selected programmed capacity code until the first of one of two conditions occur: a) two minutes have elapsed; or b) until power within the dive 750 is reset. In a still further embodiment, all supported capacity codes will be displayed twice in a row, as an ease in selection.

Those skilled in the art to which this application relates will appreciate that other and further additions, deletions, substitutions and modifications may be made to the described embodiments.

What is claimed is:

1. A method of retrieving data for an active subnet controller of a subnet in an HVAC network, comprising:
  reporting by a device on said subnet of a loss of internal memory settings to said active subnet controller;
  recognizing said device by said active subnet controller;
  requesting at least one list of parameters from said device by said active subnet controller; and
  employing an order of said at least one list of parameters to convey corresponding stored values of these parameters from said active subnet controller to said coupled device.

2. The method of claim 1, wherein said at least one list comprises:
  a feature manifest parameter list from said coupled device;
  a non-communicating scan parameters list from said device; and
  a parameter scan parameter list from said device.

3. The method of claim 1, wherein said recognizing occurs when:
  a device designator of said devices exactly matches a stored device designator value in said subnet controller; and
  an equipment type of said device is a same type as an equipment type stored in said subnet controller.

4. The method of claim 3, wherein said device designator comprises a media access control (MAC) layer address for said device.

5. The method of claim 1, wherein said order is an exact order.

6. A subnet controller that can retrieve data in an HVAC network, comprising:
  a receiver than receives from a coupled device an indication of a loss of internal memory settings to said subnet controller in said HVAC;
  a recognizer configured to recognize said coupled device;
  a requester configured to requests at least one list of parameters from said device by said subnet controller; and
  a parameter retriever configured to employ an order of said at least one list of parameters to retrieve corresponding values of these parameters and convey these parameters to said coupled device according to said order.

7. The subnet controller of claim 6, wherein said at least one list comprises:
  a feature manifest parameter list from said coupled device;

a non-communicating scan parameters list from said device; and a parameter scan parameter list from said device.

8. The subset controller of claim 6, wherein said recognition occurs when:

a device designator of said device exactly matches a stored device designator value in said subnet controller; and an equipment type of said device is a same type as an equipment type stored in said subnet controller.

9. The subnet controller of claim 7, wherein said device designator comprises a media access (MAC) layer address for said device.

10. The subnet controller of claim 7, wherein said order is an exact order.

11. The subnet controller of claim 7, wherein said subnet controller is further configured to determine whether an entire memory of said subnet controller, said memory correlating to stored parameters for a given set of devices in a subnet of said HVAC network, is corrupted, wherein if said entire memory is corrupted, said subnet controller is further configured to require all devices of said given set of devices to convey to said subnet controller:

a) a full feature manifest, and
b) a full parameter scan.

12. The system of claim 11, wherein said subnet controller is further configured to determine whether a portion of said memory, correlating to stored parameters for a particular device, is corrupted, wherein if said portion of memory is corrupted, said network controller is further configured to command said particular devices to convey to said subnet controller:

a) a full feature manifest, and
b) a full parameter scan.

13. The system of claim 12, wherein said subnet controller is further configured to determine whether a portion of said memory correlating to a device in said HVAC network is corrupted, wherein if said memory of said device is corrupted, requiring said device to convey to said subnet controller:

a) a full feature manifest, and
b) a full parameter scan.

14. The system of claim 13, wherein said memory is a non-volatile memory.

15. A method of memory recovery in an HVAC network, comprising:

determining whether an entire memory, correlating to stored parameters for a given set of devices, of an active subnet controller in said HVAC network is corrupted; and if said entire memory is corrupted, requiring each device of said given set of devices to convey to said active subnet controller:

a) a full feature manifest, and
b) a full parameter scan.

16. The method of claim 15, further comprising:

determining whether a portion of a memory of said active subnet controller in said HVAC network is corrupted; and if said portion of memory is corrupted, requiring particular devices correlated to said portion to convey to said active subnet controller:

a) a full feature manifest, and
b) a full parameter scan.

17. The method of claim 15, further comprising:

determining whether a portion of a memory of a device in said HVAC network is corrupted; and if said memory of said device is corrupted, requiring said device to convey to said active subnet controller:

a) a full feature manifest, and
b) a full parameter scan.

18. The method of claim 15, wherein said memory is a non-volatile memory.

19. The method of claim 11, wherein said determining occurs when said active subnet controller determines whether a memory corruption has occurred in at least one of:

a) a configuration mode, and
b) a verification mode.

20. The method of claim 16, wherein said determining occurs with at least one of a) a full feature scan, and
b) a full parameter scan.

* * * * *

UNITED STATES PATENT AND TRADEMARK OFFICE
CERTIFICATE OF CORRECTION

PATENT NO. : 8,437,877 B2  
APPLICATION NO. : 12/603493  
DATED : May 7, 2013  
INVENTOR(S) : Wojciech Grohman and Darko Hadzidedic Page 1 of 1

It is certified that error appears in the above-identified patent and that said Letters Patent is hereby corrected as shown below:

In the Specifications:

Column 1, line 8, after the word "of" please insert --U.S. Provisional Application Ser. No. 61/852,676, filed by Grohman, et al., on April 7, 2009, entitled "Comprehensive HVAC Control System," and--

Signed and Sealed this  
Twentieth Day of August, 2013

Teresa Stanek Rea  
*Acting Director of the United States Patent and Trademark Office*